United States Patent [19]

Yoshiyama et al.

[11] Patent Number: 4,485,336

[45] Date of Patent: Nov. 27, 1984

[54] ELECTRONIC FLASH DEVICE

[75] Inventors: Ichiro Yoshiyama, Kobe; Yoshio Yuasa, Kawachinagano; Nobuyuki Taniguchi, Tondabayashi; Norio Ishikawa, Osaka, all of Japan

[73] Assignee: Minolta Camera Kabushiki Kaisha, Osaka, Japan

[21] Appl. No.: 470,954

[22] Filed: Mar. 1, 1983

[30] Foreign Application Priority Data

Mar. 2, 1982 [JP] Japan ................... 57-33246

[51] Int. Cl.$^3$ ............................................. H05B 41/32
[52] U.S. Cl. ................... 315/241 P; 250/226;
315/151; 315/152; 315/155; 315/232; 315/324;
354/132; 362/11; 362/17
[58] Field of Search ................. 315/151–155,
315/159, 232, 241 P, 294, 324; 354/132, 145.1,
430, 482; 362/4, 5, 11–13, 16–18; 250/214 P,
226

[56] References Cited

U.S. PATENT DOCUMENTS

| 3,045,124 | 7/1962 | McKinlay, Jr. | 354/482 X |
| 3,580,149 | 5/1971 | Fujisha | 354/430 |
| 4,041,308 | 8/1977 | Jujita | 250/226 |
| 4,335,943 | 6/1982 | Numata | 354/482 X |

FOREIGN PATENT DOCUMENTS 142517 11/1981 Japan ................. 315/241 P

Primary Examiner—Eugene R. Laroche
Attorney, Agent, or Firm—Jackson, Jones & Price

[57] ABSTRACT

In an electronic flash device for use in a still camera, a calculation circuit means calculates a ratio of the amounts of light to be emitted by a plurality of flash light tubes on the basis of color temperature information and control circuit means controls the emission of light of the respective flash light tubes in such a manner that the ratio of light amount emitted from the respective flash light tubes corresponds to the ratio calculated by the calculation circuit means.

24 Claims, 13 Drawing Figures

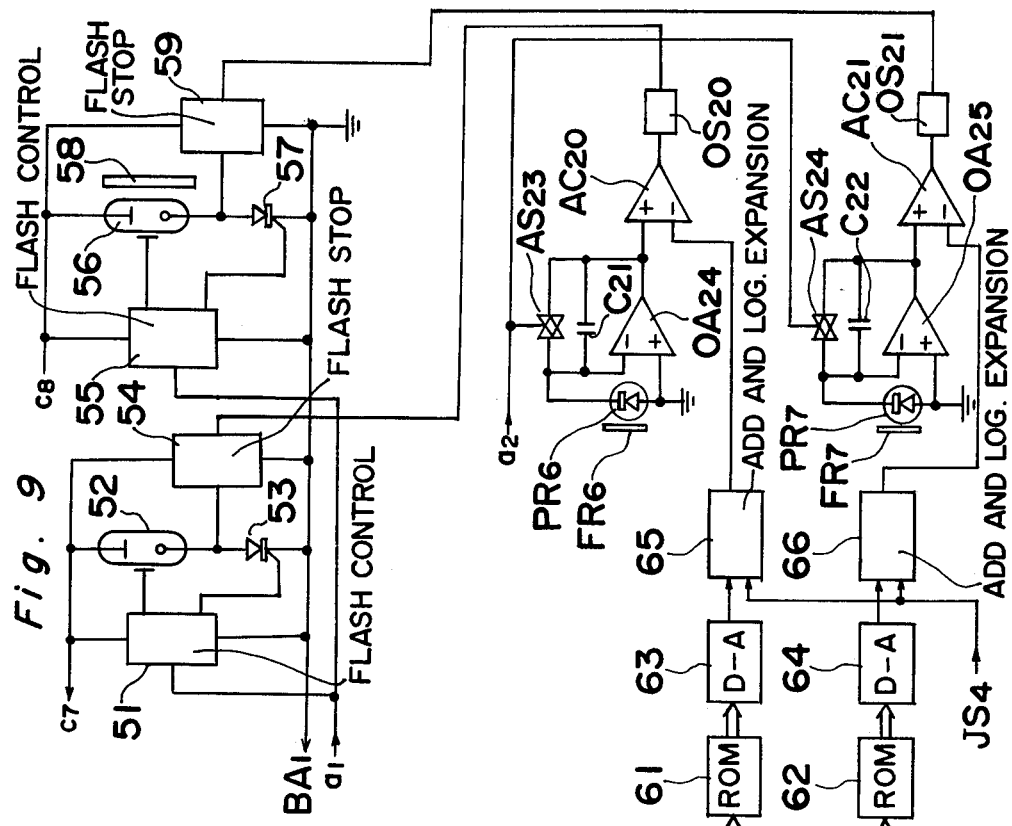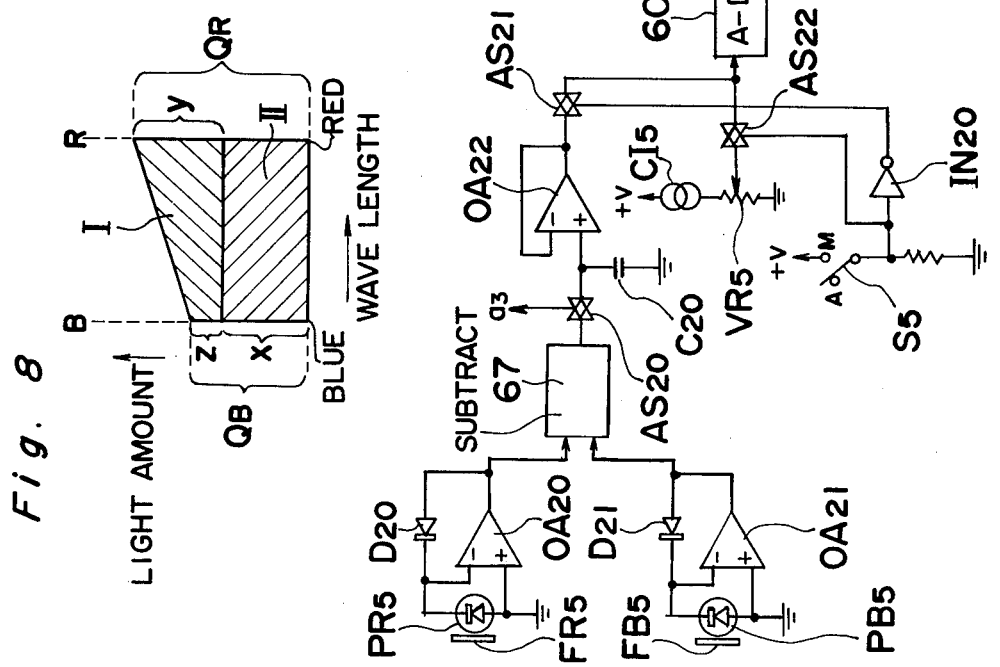
Fig. 9
Fig. 8

ELECTRONIC FLASH DEVICE

FIELD OF THE INVENTION

The present invention relates to an electronic flash device which is able to emit flash light having a predetermined desired color temperature.

BACKGROUND OF THE INVENTION

It is well known to use a flash light source such as a xenon tube to illuminate objects when taking pictures.

In a conventional flash device, spectral characteristics defined for one flash device cannot be varied by the operator. Accordingly, when such a conventional flash device is used as an auxiliary illuminating light source for an object to be photographed under such conditions that the main light source is fed from fluorescent tubes or the picture is taken in the evening glow, there sometimes occurs a difference of spectral characteristics between the main light source and the auxiliary light source, thereby resulting in nonuniform color shading in a printed picture due to the difference of distribution of light.

In a case where a flash light is used for a main light source, i.e., the object is illuminated only by the flash light, if the spectral characteristic of a given film is not suitable for that of the flash light, e.g., in the case when a film of tungsten type is used with the flash light emitted by a xenon tube, an unnatural color print may be obtained.

Furthermore, when taking a picture, a color correction filter is often used for compensating the spectral difference between the main illuminating light source and a light sensing member such as a film, there may occur color shading in a printed picture if a flash device is used as an auxiliary light source, the spectral characteristic of which is different from that of the main light source. In general, when an object to be photographed is illuminated by two kinds of light sources, color compensation by color correction filters cannot be expected.

As understood from the foregoing, the conventional flash devices show a disadvantage in that they cannot provide a good light for illuminating the object in various cases as mentioned above to obtain a good print having uniform color distribution.

A color enlarger for photographic color printing is known in which a plurality of lamps such as halogen lamps having flat spectral distribution characteristics of the emitted light are used with various filters each having different spectral characteristics placed in front of the respective halogen tubes so that desired spectral characteristics, e.g., color temperature can be obtained by controlling the amount of the compensation with the filters.

However the above mentioned device is very complicated and cumbersome in construction and so expensive that the device is not suitable for use in an electronic flash device. Furthermore, since the device must be supplied with power from a commercial power source, it is not suitable for use as a main light source or an auxiliary light source for illuminating an object to be photographed.

SUMMARY OF THE INVENTION

An essential object of the present invention is to provide an electronic flash device which can emit flash light having desired spectral characteristics or color temperature.

Another object of the present invention is to provide an electronic flash device wherein the color temperature of the emitted light can be varied optionally.

A further object of the present invention is to provide an electronic flash device in which the color temperature of the flash light can automatically be controlled so that the color temperature of the flash device matches with that of the main illuminating light source and/or a light sensitive material such as a photographic film or a charge coupled device (CCD) to enable uniform color tone or hue in a picture.

A still further object of the present invention is to provide an electronic flash device which is cheap in cost and simple in construction with the color temperature controlled optionally so that the flash device can easily be applied to picture takings.

According to the present invention, there is provided an electronic flash device for use in a still camera, which comprises means for producing desired color temperature information, means for emitting flash light, the color temperature of which can be varied and means for controlling the color temperature of the flash light of the flash light emitting means in response to the color temperature information set in the means for producing color temperature information.

BRIEF EXPLANATION OF THE DRAWINGS

FIG. 8 is a graph showing color transmission characteristics of a filter with the principle of a further embodiment of the electronic flash device shown;

FIG. 9 is a circuit diagram showing one embodiment employing the filter shown in FIG. 8;

DESCRIPTION OF THE PREFERRED EMBODIMENTS

Figure 1:
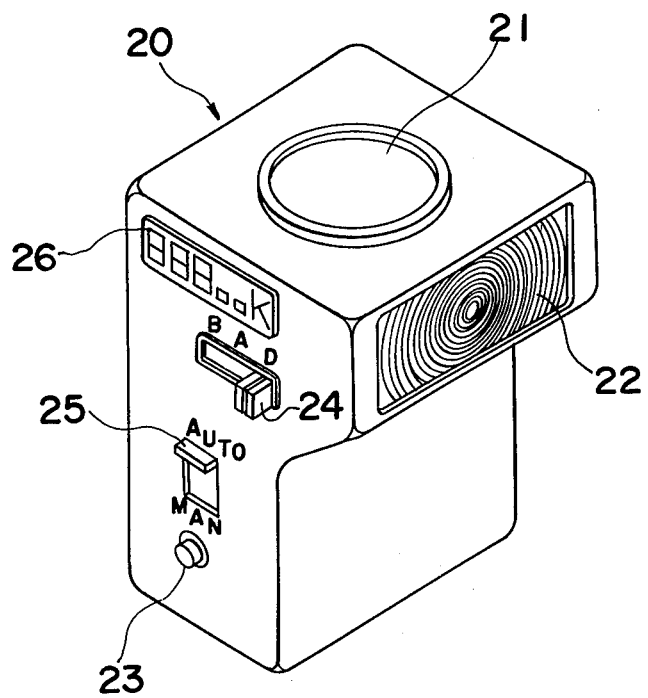
FIG. 1 is a perspective view showing an embodiment of an electronic flash device according to the present invention.

Referring to FIG. 1, in an electronic flash device 20 according to an embodiment of the present invention, a window 21 covered by a transparent light dispersion plate is defined on the top of the electronic flash device 20. On the front surface of the electronic flash device 20, a Fresnel lens 22 is provided for transmitting light from flash tubes.

Figure 2:
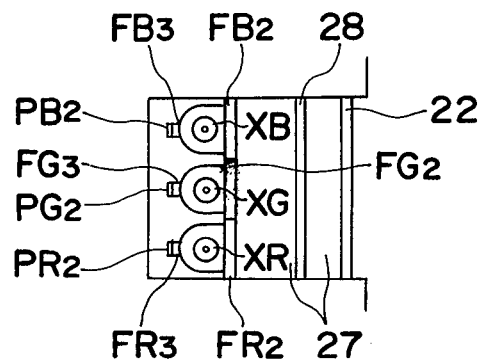
FIG. 2 is a partial plan view showing an arrangement of flash tubes employed in the embodiment shown in FIG. 1.

Inside the electronic flash device 20, three xenon flash tubes XG, XB and XR are disposed adjacent in the rear of the Fresnel lens 22 with green, blue and red filters FG2, FB2 and FR2 being interposed as shown in FIG. 2. Below the window 21, photoelectric elements PG1, PB1 and PR1 are disposed for receiving ambient light through the window 21. A green filter FG1, a blue filter FB1 and a red filter FR1 are interposed between the window 21 and respective photoelectric elements PG1, PB1 and PR1.

Adjacent to the flash tubes XG, XB and XR, there are provided photoelectric elements PG2, PB2 and PR2 with a green filter FG3, a blue filter FB3 and a red filter FR3 interposed therebetween, for respectively receiving flash lights from the flash tubes XG, XB and XR through the filters.

Between the Fresnel lens 22 and the filters FG2, FB2 and FR2, there are formed light mixing boxes 27. The walls of each mixing boxes 27 are formed of a highly light-reflective material such as polystyrene foam.

A light dispersion plate 28 is interposed between the flash tubes XG, XB and XR and the Fresnel lens 22 so that the flash light emitted from the flash tubes XG, XB and XR and transmitted outwardly from the electronic flash device 20 will be uniform in intensity with respect to its emitted direction regardless of geometric difference of the flash tubes XG, XB and XR.

A manually operated light measurement button 23 is provided on a side plate of the electronic flash device 20 for starting measurement of light from an object to be photographed. When the light measurement button 23 is operated light information such as color temperature of the object to be photographed is memorized in a memory device (not shown) and subsequent operation of the light measurement button 23 causes erasing of the light information memorized in the memory device.

A manually operated setting member 24 is provided for setting sensitivity or speed of a film with respect to color temperature. When the setting member 24 is at the position registered with symbol B in FIG. 1, the electronic flash device 20 emits a flash light of a color temperature suitable for a tungsten B type film and when the setting member 24 is registered with symbol A, the electronic flash device 20 emits a flash light of the color temperature suitable for a tungsten A type film while the electronic flash device 20 emits a flash light suitable of a color temperature for a daylight type film when the setting member 24 is registered with symbol D.

A manually operated change-over switch 25 is provided to shift the electronic flash device 20 between a manual operation mode and an automatic operation mode. When the change-over switch 25 is switched to an AUTO position, the electronic flash device 20 can emit the flash light having a color temperature in accordance with the measurement of the light incident on an object to be photographed, i.e., object illuminating light (or ambient light) through the window 21, and when the change-over switch 25 is switched to a MAN (manual) position, the electronic flash device 20 can emit the flash light having the color temperature corresponding to the set position of the setting member 24.

A display device 26 functions to display the color temperature measured through the window 21 with the changeover switch 25 at AUTO position and the color temperature corresponding to the datum set by the setting member 24 when the change-over switch 25 is at the MAN position.

Since the window 21 is provided on the top plate of the electronic flash device 20, the window 21 is upwardly directed when the electronic flash device 20 is mounted on a camera. Therefore, the ambient light may be measured substantially within allowable accuracy even if the electronic flash device 20 is brought close to the object to be photographed since the ambient light generally comes from above the electronic flash device 20.

The circuit arrangement employed in the electronic flash device 20 is hereinafter described with reference to FIG. 3. The circuit arrangement for controlling the flash tubes is shown generally in the upper half of FIG. 3 while the circuit arrangement for light measurement and operation of light data for controlling the flash tubes is shown in the lower half of FIG. 3.

In the circuit for controlling the flash tubes, a booster circuit 1 supplies a high-voltage DC power to the respective capacitors C7, C8 and C9 for flash tubes XG, XB and XR through diodes D4, D5 and D6.

Flash tube control circuits 2, 4 and 6 operate to initiate firing of the respective flash tubes XG, XB and XR applying thereto trigger voltages as well as conducting thyristors SC1, SC2 and SC3 in response to control signals fed from a control circuit 13, details of which will be hereinafter described.

Capacitors C7, C8 and C9 are connected with the respective flash tubes XG, XB and XR to energize the flash tubes.

Flash stop circuits 3, 5 and 7 are respectively connected with the thyristors SC1, SC2 and SC3 for blocking the thyristors and stopping the firing of the flash tubes XG, XB and XR in response to signals applied from monostable multivibrators OS1, OS2 and OS3 described below.

Reference numerals JS1 through JS4 denote connecting terminals provided in the electronic flash device 20 for connection with corresponding terminals JB1 through JB4 provided in the camera with which the electronic flash device 20 is associated. When the electronic flash device 20 is mounted on the camera, the terminal JS1 is grounded through the terminal JB1 and the input terminal of the control circuit 13 is connected with a switch S3, as the X synchro switch which is closed in conjunction with shutter opening in the camera, through the terminals JS2 and JB2 so that when the switch S3 is closed, i.e., the switch S3 is in an ON state, the input terminal of the control circuit 13 is grounded. A charging completion detecting circuit 8 is connected with the capacitor C9 to produce an output signal when the capacitors C7, C8 and C9 connected with the booster circuit 1 are charged up to a predetermined voltage. The output of the charging completion detecting circuit 8 is referred to as a charging completion signal. The output terminal of the charging completion detecting circuit 8 is connected with the input terminal of an exposure control circuit 9 in the camera through the terminals JS3 and JB3.

The terminal JS4 is connected, through the terminal JB4, with the output terminal of an exposure calculation circuit 12 for calculating a desired amount of flash light for taking a good photograph, on the basis of data from a distance setting device 10 and a diaphragm aperture setting device provided in the camera.

The photoelectric element PG1 receives the light in a green range of the object illuminating or ambient light through the green filter FG1 to produce a photoelectric current IG showing the intensity of the light in the green range, i.e., green component of the light. The photoelectric element PG1 is connected with the input terminal of an operational amplifier OA2 which has a logarithmic compression diode D2 to generate a signal lnIG, i.e., the logarithmic compressed value of the photoelectric current IG. The output of the operational amplifier OA2 is connected with respective input terminals of subtraction circuits 14 and 15.

The photoelectric elements PB1 and PR1 respectively receive blue and red light components of the object illuminating or ambient light through the filters FB1 and FR1 to produce photoelectric currents IB and IR. Both of the photoelectric elements PB1 and PR1 are connected with corresponding operational amplifiers OA1 and OA3 which respectively have logarithmic compression diodes D1 and D3 to produce logarithmically compressed signals lnIB and lnIR. The output terminal of the operational amplifier OA1 is connected with the input terminal of the subtraction circuit 14 which operates subtraction of lnIG−lnIB, i.e., the division of IG/IB.

The output terminal of the subtraction circuit 14 is connected with a non-inverting input terminal of an operational amplifier OA4 through an analog switch AS1 which is blocked (OFF) by a signal fed from a terminal a₃ of the control circuit 13. A capacitor C2 is connected with a noninverting input terminal of the operational amplifier OA4 and memorizes the output voltage of the subtraction circuit 14 when the analog switch AS1 is blocked.

The output terminal of the operational amplifier OA3 is connected with the other input terminal of the subtraction circuit 15 which operates the subtraction of lnIR−lnIG, i.e., division of IR/IG. The output of the subtraction circuit 15 is connected with a non-inverting input terminal of the operational amplifier OA5 through an analog switch AS2. A capacitor C3 is connected with a non-inverting terminal of an operational amplifier OA5 to memorizes the output voltage of the subtraction circuit 15 when the analog switch AS2 is blocked by the signal from the control circuit 13.

The output terminal of the operational amplifier OA4 is connected with one input terminal of a subtraction circuit 16 through an analog switch AS3 which is blocked by a low-level output signal from an inverter IN3 which receives a high-level signal when a change-over switch S5 is switched to a contact M, i.e., the device is in a manual operation mode, and vice versa. A variable resistor VR1 is connected with a constant current source CI1 and a slide contact of the variable resistor VR1 is connected with the input terminal of a subtraction circuit 16 through an analog switch AS4, the control input of which is connected with the change-over switch S5. Thus, when the change-over switch S5 is switched to the manual contact M, analog switch AS4 receives a high-level signal and conducts, and vice versa. With this circuit arrangement, when the change-over switch S5 is switched to a contact A for an automatic operation mode, the output of the operational amplifier OA4 is applied to the input terminal of the subtraction circuit 16. On the other hand, when the change-over switch S5 is switched to the contact M for the manual operation mode, the output of the variable resistor VR1 is applied to the subtraction circuit 16. The slider of the variable resistor VR1 is linked with the setting member 24.

The output of the operational amplifier OA5 is connected with an input terminal of an addition circuit 17 through an analog switch AS4 which is blocked when the output of an inverter circuit IN3 is at being a high-level and vice versa. A variable resistor VR2 is connected with a constant current source CI2 and the slide contact of the variable resistor VR2 is connected with the input terminal of an addition circuit 17 through an analog switch AS6, the control input of which is connected with the change-over switch S5 so that the analog switch AS6 conducts with a high-level input to its control input and vice versa. By this circuit arrangement, when the change-over switch S5 is switched to the contact A for the automatic operation mode, the output of the operational amplifier OA5 is applied to the input terminal of an addition circuit 17. On the other hand, when the change-over switch S5 is switched to the contact M for the manual operation mode, the output voltage of the variable resistor VR2 is applied to the addition circuit 17. The slider of the variable resistor VR2 is linked with the setting device 24.

From the slide contact of the variable resistor VR1, the ratio in amount of the flash light in the blue range to the flash light in the green range can be generated in relation to the set position of the setting device 24. Similarly, from the slide contact of the variable resistor VR2, the ratio in amount of the flash light in the red zone to the flash light in the green zone can be generated.

In the operational amplifier 12, a desired amount of light from the flash tube XG is calculated on the basis of information fed from the distance setting device 10 and the diaphragm aperture setting device 11 to generate a value QG which is a logarithmically compressed value of the desired amount of light to be produced by the flash tube XG.

The output of the operational amplifier 12 is connected to the base of a transistor BT1, the collector of which is connected with the base of a transistor BT2. The collector of the transistor BT2 is grounded through a resistor R2 so that a signal QG which is logarithmically expanded from the value lnQG can be generated across the resistor R2.

The signal QG appearing across the resistor R2 is supplied to one input terminal of a comparator AC1.

A photoelectric element for receiving the green range light of the flash tube XG is connected between input terminals of an operational amplifier OA6 which integrates the photoelectric current of the photoelectric element PG2 by a capacitor C4 when an analog switch AS7 is in an OFF state.

The output of the operational amplifier OA6 is connected with another input terminal of the comparator AC1, which generates a high-level signal when the output of the amplifier OA6 corresponding to the amount of the green component of the light emitted from the flash tube XG exceeds the voltage across the resistor R2, i.e., the value QG defined by the output of the operational amplifier 12, thereby supplying the flash stop signal to the flashing stop circuit 3 through the monostable multivibrator OS1.

The subtraction circuit 16 conducts the following operation:

$$\ln QG - \ln(IG/IB) = \ln(QG \cdot IB/IG) = \ln QB$$

On the other hand, the addition circuit 17 conducts the following operation:

$$\ln QG + \ln(IR/IG) = \ln(QG \cdot IR/IG) = \ln QR$$

The output of the subtraction circuit 16 is connected with the base of a transistor BT3, the collector of which is connected with the base of a transistor BT4. The collector of the transistor BT4 is grounded through a resistor R3 so that a logarithmically expanded signal QB is generated across the resistor R3.

The output across the resistor R3 is applied to one input terminal of a comparator AC2.

The photoelectric element PB2 for receiving the blue range light of the flash tube XB is connected between input terminals of an operational amplifier OA7 which integrates the photoelectric current of the photoelectric element PB2 by the capacitor C5 when an analog switch AS8 is in an OFF state.

The output terminal of the operational amplifier OA7 is connected with another input terminal of the comparator AC2 which generates a high-level signal when the output of the amplifier OA7 corresponding to the amount of the blue component of the light emitted from the flash tube XB exceeds the voltage across the resistor R3 corresponding to the value lnQB, thereby supplying a flash stop signal to the flash stop circuit 5 through the monostable multivibrator OS2.

The output of the addition circuit 17 is connected with the base of a transistor BT5, the collector of which is connected with the base of a transistor BT6. The collector of the transistor BT6 is grounded through a resistor R4 so that a logarithmically expanded signal QR is generated across the resistor R4.

The output across the resistor R4 is applied to one input terminal of a comparator AC3.

The photoelectric element PR2 for receiving the light of the flash tube XR is connected between input terminals of an operational amplifier OA8, which integrates the photoelectric current of the photoelectric element PR2 by a capacitor C6 when an analog switch AS9 is in a OFF state.

The output terminal of the operational amplifier AC3 is connected with another input terminal of the comparator AC3, which generates a high-level signal when the output of the amplifier OA8 corresponding to the amount of the red component of the light emitted from the flash tube XR exceeds the voltage across the resistors R4 corresponding to the value QR, thereby supplying the flashing stop signal for the flashing stop circuit 7 through the monostable multivibrator OS3.

Figure 4:
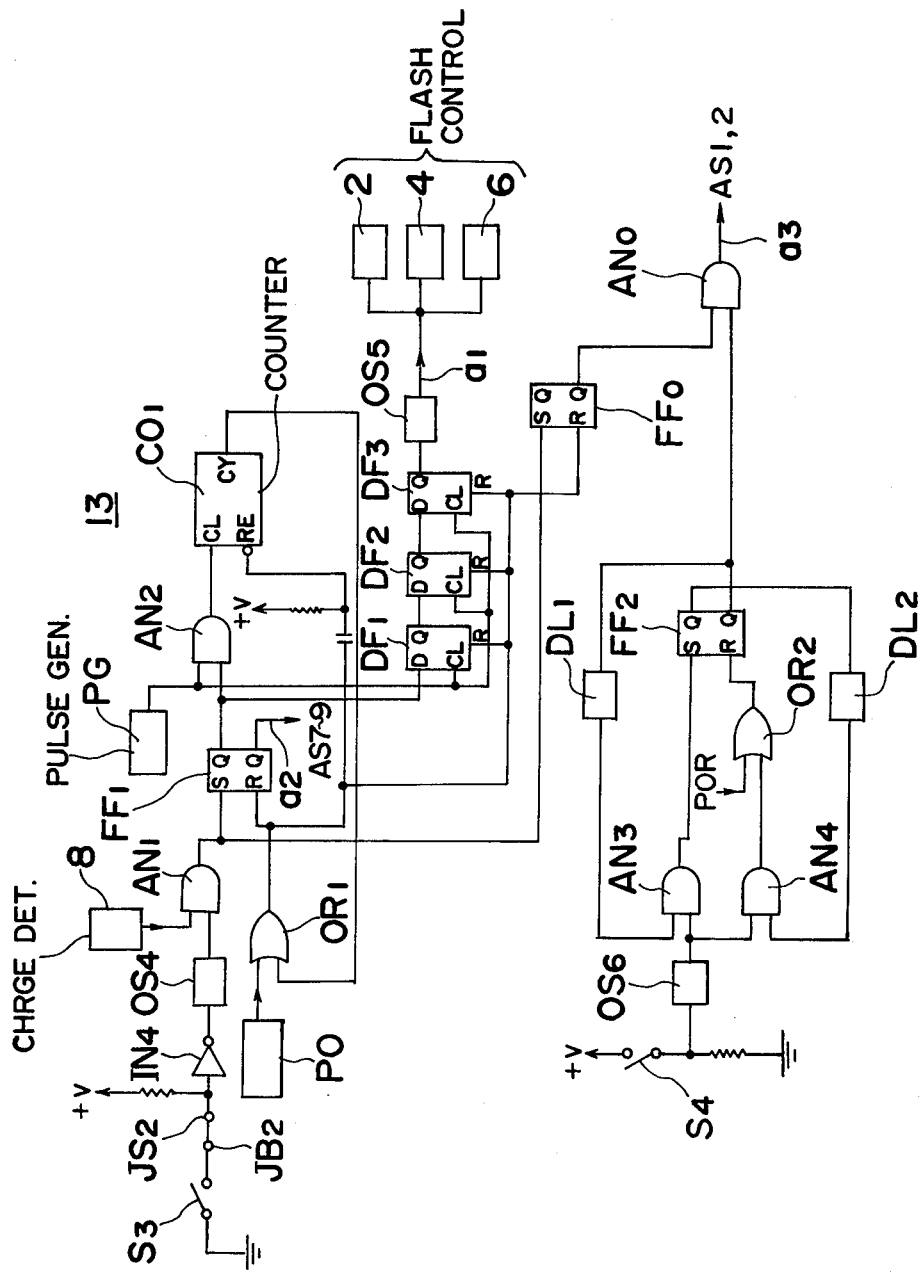
FIG. 4 is a circuit diagram showing an example of the control circuit employed in the embodiment shown in FIG. 3.

The circuit arrangement of the control circuit 13 is shown in FIG. 4, in which the switch S3 is connected with a monostable multivibrator OS4 through the terminals JB2 and JS2 and an inverter IN4 so that the monostable multivibrator OS4 generates a one-shot pulse in response to the positive edge of the output of the inverter IN4 when the switch S3 is turned on. The output of the monostable multivibrator OS4 is connected with a set input terminal of a flip-flop FF1 through an AND circuit AN1 which is enabled by the charging completion signal from the charging completion detecting circuit 8.

An output terminal of a pulse generator PG which produces a series of clock pulses, is connected with a clock input terminal of a counter CO1 through an AND circuit AN2 which is enabled by Q-output of the flip-flop FF1 so that the counter CO1 counts the clock pulses and generates a carry signal from a terminal CY after a lapse of a given time period. The carry signal of the counter CO1 is applied to a reset input terminal of the flip-flop FF1 through an OR circuit OR1 to reset the flip-flop FF1, thereby causing its $\overline{Q}$ output to be high to generate a high-level signal at a terminal $a_2$. The counter CO1 is reset by the carry signal through the OR circuit OR1. The counter CO1 counts a time sufficient for all the flash tubes XG, XB and XR to complete their firing.

The Q output of the flip-flop FF1 is also connected with an input terminal D of a first flip-flop DF1 and the clock terminal thereof is connected with the output terminal of the pulse generator PG. Flip-flops DF1 through DF3 are connected in a cascade connection manner with all of the clock terminals connected with the output terminal of the pulse generator PG so that a high-level signal is generated to produce an output of high level at the Q output terminal of the flip-flop DF3 after a delay of time corresponding to three clock pulses. The time counted by the flip-flop DF1 through DF3 is set to cover the time during which the outputs QB and QR across the resistors R4 and R5 are stabilized.

The output of the flip-flop DF3 is fed to the terminal $a_1$ to be used for the flash tube control circuits 2, 4 and 6.

A switch S4 for starting the light measurement is connected with a monostable multivibrator OS6 which is triggered by the positive edge of the output of the switch S4. The monostable multivibrator OS6 is connected to AND circuits AN3 and AN4. The output of the AND circuit AN3 is connected with the set input terminal of the flip-flop FF2 having the reset input terminal thereof connected with the output of the AND circuit AN4 through an OR circuit OR2. The Q output of the flip-flop FF2 is connected with the input terminal of the AND circuit AN4 through a delay circuit DL2. The $\overline{Q}$ output of the flip-flop FF2 is fed to a terminal $a_3$ through an AND circuit AN0.

With this circuit arrangement, when the switch S4 is closed with the flip-flop FF2 being reset, the flip-flop FF2 is set by the closure of the switch S4 to generate a high-level signal at the terminal $a_3$ and subsequent closure of the switch S4 causes the flip-flop FF2 to be again reset, thereby inverting the signal at the terminal $a_3$ to a low level as hereinafter explained.

The output of the AND circuit AN1 is connected with the set input terminal of the flip-flop FF0, the reset output terminal of which is connected to the input terminal of AND circuit AN0. The reset input terminal of the flip-flop FF0 is connected with the output terminal of the OR circuit OR1 so that the flip-flop FF0 can be reset by the carry signal from the counter CO1.

Figure 3A:
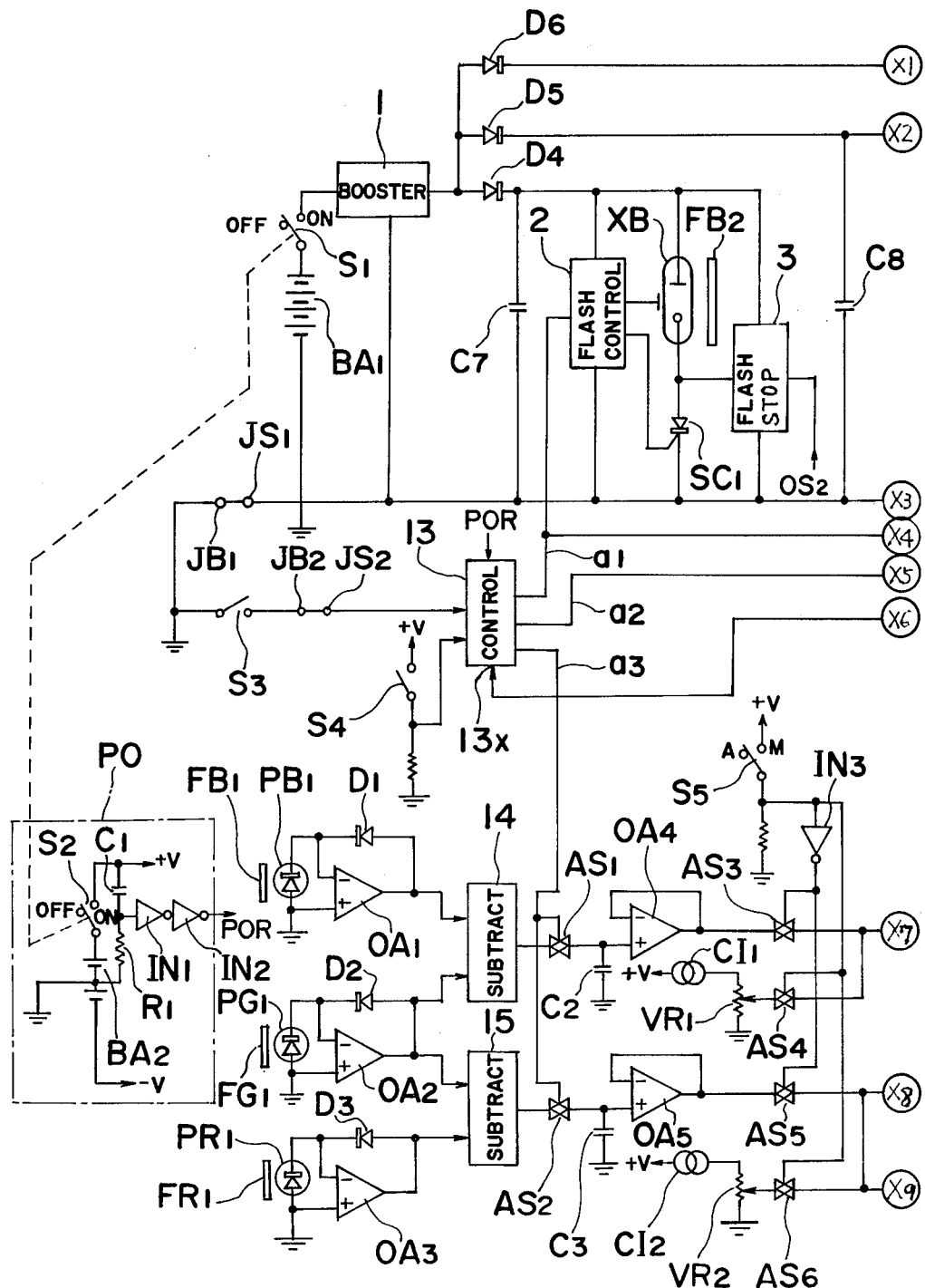
FIG. 3 ( FIGS. 3a and 3b) is a circuit diagram showing an embodiment of the electronic flash device according to the present invention.
Figure 3B:
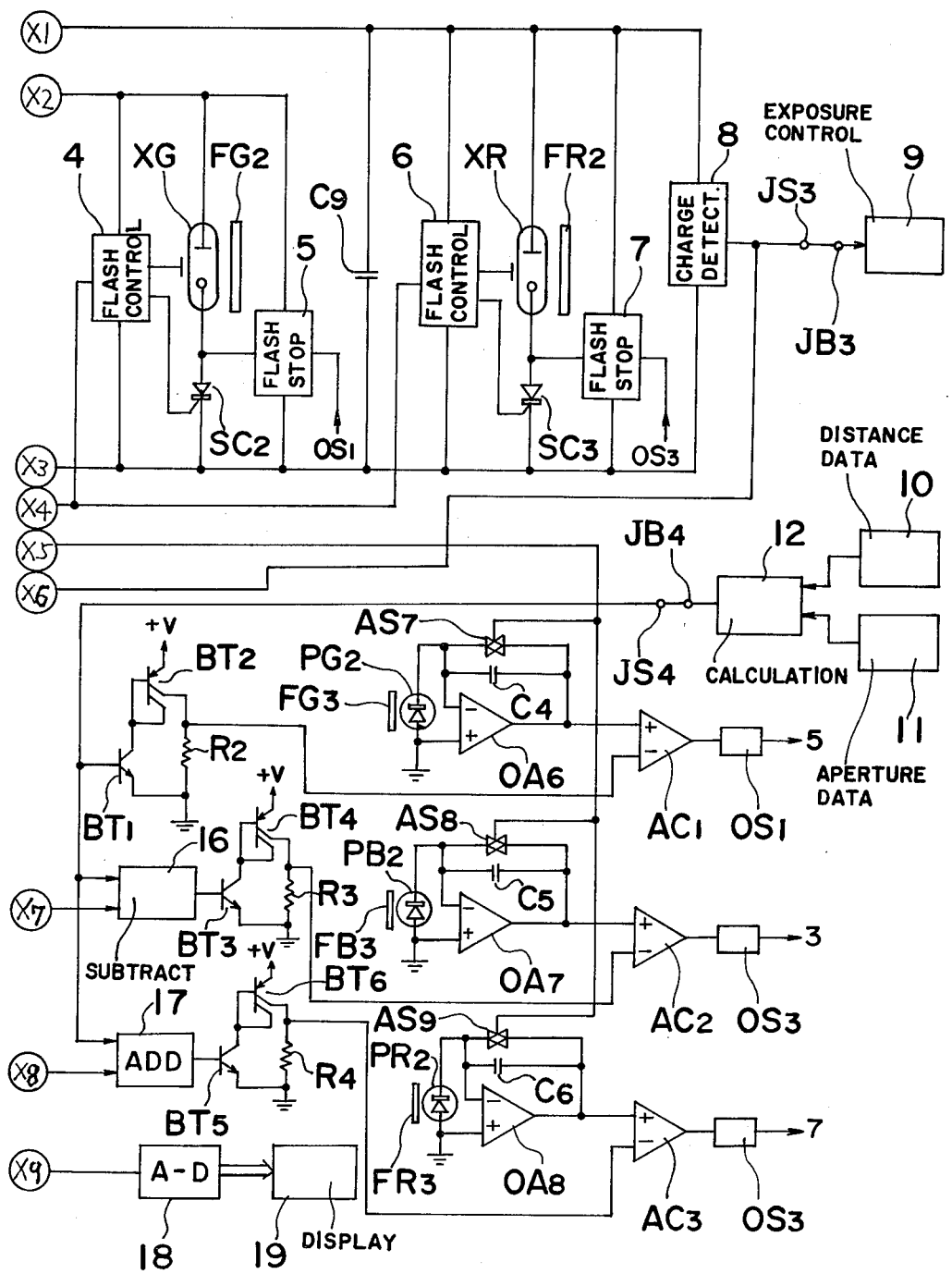

A power-on reset signal generated from a power-on reset circuit PO shown in FIG. 3 is fed through the terminal POR to the OR circuits OR1 and OR2 so that the flip-flops FF1 and FF2 can be reset when power is supplied to the control circuit 13.

Referring to FIG. 3, the booster circuit 1 starts its operation upon closure of the power supply switches S1 and S2, and applies high voltage electric power to the main capacitors C7, C8 and C9 through the diodes D4, D5 and D6. When the charging voltage for the main capacitor C9 reaches a predetermined value, the output of the charging completion detecting circuit 8 is inverted to a high level, the high level signal being transmitted to the exposure control circuit 9 through the terminals JS3 and JB3 for switching the camera to a flash photography mode. This high-level from the charging completion detecting circuit 8 is also transmitted to the control circuit 13.

The photoelectric elements PB1, PG1 and PR1 for measuring color temperature receive the object illuminating or ambient light through the blue filter FB1, the green filter FG1 and the red filter FR1 respectively. Then photoelectric currents $I_B$, $I_G$ and $I_R$ respectively corresponding to the intensity of the blue light, green light and red light flow respectively produced by the photoelectric elements PB1, PG1 and PR1, so that the operational amplifiers OA1, OA2 and OA3 respectively generate signals $\ln I_B$, $\ln I_G$ and $\ln I_R$ obtained by logarithm compression of the photoelectric currents. The signals $\ln I_B$ and $\ln I_G$ are input to the subtraction circuit 14, which in turn generates a signal $\ln(I_G/I_B)$ relying on the difference between the signal $\ln I_G$ and the signal $\ln I_B$ while the signals $\ln I_G$ and $\ln I_R$ are input to the subtraction circuit 15, which generates a signal $\ln(I_R/I_G)$ relying on the difference between the signal $\ln I_R$ and the signal $\ln I_G$.

When the shutter (not shown) of the camera is operated and the X synchro switch S3 of the camera is turned ON, the terminal $a_2$ of the control circuit 13 is inverted to a low level to turn the analog switches AS7, AS8 and AS9 OFF so that the capacitors C4, C5 and C6 integrate the photoelectric currents commensurate with the outputs of the photoelectric elements PG2, PB2 and PR2 generated by the light of the flash tubes XG, XB and XR respectively. When the terminal $a_3$ of the control circuit 13 is inverted to a low level by the closure of the switch S4 upon operation of the button switch 26 for initiating light measurement operation, or, when the terminal $a_3$ is inverted to a low level in response to the closure of the X synchro switch S3 as hereinafter described, the analog switches AS1 and AS2 are turned OFF so that the capacitors C2 and C3 respectively store the signals $\ln(I_G/I_B)$ and $\ln(I_R/I_G)$ at the time of operation of the switch S4 or at the time of closing of the X synchro switch S3. When the change-over switch 25 (FIG. 1) is set in an "AUTO" position, the analog switches AS3 and AS5 are rendered conductive so that the signal $\ln(I_G/I_B)$ stored in the capacitor C2 is input into the subtraction circuit 16 through the operational amplifier OA4 and the analog switch AS3 while the signal $\ln(I_R/I_G)$ stored in the capacitor C3 is input into the addition circuit 17 through the operational amplifier OA5 and the analog switch AS5.

The calculation circuit 12 generates a signal $\ln Q_G$ representing the logarithmic expansion of the quantity $Q_G$ of the green flash light for attaining the proper exposure, and the signal $\ln Q_G$ is converted into a signal $Q_G$ by logarithmic compression by a circuit formed by the transistors BT1 and BT2 and the resistor R2, with the converted signal being input into the comparator AC1. The signal $\ln Q_G$ generated from the operational circuit 12 is also input into the subtraction circuit 16 and the addition circuit 17 so that an operation of $\ln Q_B = \ln Q_G(I_B/I_G)$ is conducted in the subtraction circuit 16 to generate a signal $\ln Q_B$ representing the result of the operation while an operation $\ln Q_R = \ln Q_G(I_R/I_G)$ is conducted in the addition circuit 17 and a signal $\ln Q_R$ representing the result of the operation is generated. The signal $\ln Q_B$ is converted into a signal $Q_B$ by a circuit formed by the transistors BT3 and BT4 and the resistor R3 and is input into the comparator AC2 while the signal $\ln Q_R$ is converted into a signal $Q_R$ by a circuit formed by the transistors BT5 and BT6 and a resistor R4 to be input into the comparator AC3.

After a lapse of a predetermined time from the time when the integration by the capacitors C4, C5 and C6 was enabled upon inversion of the terminal $a_2$ of the control circuit 13 to a low level, the control circuit 13 generates at the terminal $a_1$ a pulse of a high level, which is input into the triggering circuits 2, 4 and 6 to trigger the firing of the flash tubes XB, XG and XR. The flash lights from the flash tubes XB, XG and XR are emitted through the Fresnel lens 22 (FIG. 1) and respectively through the blue filter FB2, the green filter FG2 and the red filter FR2. The flash lights from the flash tubes XG, XB and XR are also received through the green filter FG3, the blue filter FB3 and the red filter FR3 respectively by the photoelectric elements PG2, PB2 and PR2, which in turn generate photoelectric currents corresponding to the intensities of the received lights, and the photoelectric currents are respectively applied to the capacitors C4, C5 and C6. As the firing of the green flash tube XG proceeds, the charging voltage of the capacitor C4 increases until the output of the operational amplifier OA6 reaches the signal $Q_G$ representing the proper flash quantity of the green region, when the output terminal of the comparator AC1 is inverted to a high level so that the monostable multivibrator OS1 generates a pulse, which is input into a the flashing stop circuit 5 to stop the firing of the green flash tube XG. In a similar manner, as the firing of the blue flash tube XB proceeds, the charging voltage for the capacitor C5 increases. When the output of the operational amplifier OA7 reaches the signal $Q_B$ representing the proper flash quantity of the blue region, the output terminal of the comparator AC2 is inverted to a high level so that the pulse generated from the monostable multivibrator OS2 is input into the flashing stop circuit 3 to stop firing of the blue flash tube XB. Likewise, as the firing of red flash tube XR proceeds, the charging voltage for the capacitor C6 increases. When the output of the operational amplifier OA8 reaches the signal $Q_R$ representing the proper flash quantity of the red region, the output terminal of the comparator AC3 is inverted to a high level so that the pulse generated from the monostable multivibrator OS3 is input into the flashing stop circuit 7 to stop flashing of the red flash tube XR.

As hereinabove described, when the change-over switch 25 (FIG. 1) is set at "AUTO", the quantity of the light emitted from the green flash tube XG is controlled to attain the value $Q_G$ as provided from the operational circuit 12 as proving a proper exposure. The quantity of the light emitted from the blue flash tube XB is controlled to attain the value $Q_B$ as determined by the green proper flash light quantity $Q_G$ and the ratio between the output current $I_B$ of the photoelectric element PB1 detecting the blue component of the object illuminating or ambient light and the output current $I_G$ of the photoelectric element PG1 detecting the green component of the light while the flash quantity of the red flash tube XR is controlled to attain the value $Q_R$ as determined by the green proper flash light quantity $Q_G$ and the ratio between the output current $I_R$ of the photoelectric element PR1 detecting the red component of the object illuminating or ambient light and the output current $I_G$ of the photoelectric element PG1 detecting the green component of the light. The ratio between the respective quantities of the flash light emitted from the flash tubes XB, XG and XR is:

$$Q_B:Q_G:Q_R = I_B:I_G:I_R$$

Namely, the ratio of the flash quantities is equal to the ratio of the amounts of the lights detected as to the respective spectral regions of blue, green and red, and the flash tubes XB, XG and XR are controlled to conform to the color temperature of the object illuminating or ambient light as measured.

On the other hand, when the change-over switch 25 (FIG. 1) is set at "MAN" which indicates manual setting, the switch S5 is connected to the terminal M to turn the analog switches AS4 and AS6 ON while the output of the inverter IN3 is inverted to a low level to turn the analog switches AS3 and AS5 OFF. In this case, the subtraction circuit 16 and the addition circuit 17 are respectively applied with voltages determined by the output currents of the constant current sources CI1 and CI2 and by resistance values set in the variable resistors VR1 and VR2. The voltages are settled by changes in positions of sliding elements of the variable resistors VR1 and VR2 in response to the set position of the setting member 24 as shown in FIG. 1. When the setting member 24 is at the position B, the signals $\ln I_G/I_B$ and $\ln I_R/I_G$ defined by a color temperature of 3200° K. corresponding to the B-type film of tungsten type are input into the subtraction circuit 16 and the addition circuit 17 through the analog switches AS4 and AS6, while the signals $\ln(I_G/I_B)$ and $\ln(I_R/I_G)$ defined by a color temperature of 3400° K. corresponding to the A-type film of tungsten type are input into the subtraction circuit 16 and the addition circuit 17 through the analog switches AS4 and AS6 when the setting member 24 is at the position A and the signals $\ln(I_G/I_B)$ and $\ln(I_R/I_G)$ defined by a color temperature of 5500° K. corresponding to a daylight type film are input into the subtraction circuit 16 and the addition circuit 17 through the analog switches AS4 and AS6 when the setting member 24 is at the position D. In this case, the green flash tube XG is controlled to emit the quantity $Q_G$ of flash light in compliance with the output from the operational circuit 12 and the blue flash tube XB is controlled to emit the quantity $Q_G$ of green flash light as determined by the green flash quantity $Q_G$ and the datum provided from the circuit of the constant current source CI1 and the variable resistor VR1 while the red flash tube XR is controlled to emit the quantity $Q_R$ of red flash light as determined by the red flash quantity $Q_R$ and the datum provided from the circuit of the constant current source CI2 and the variable resistor VR2.

In FIG. 3, the analog-to-digital converter 18 functions to convert the signal of the datum $\ln(I_R/I_G)$ generated through the analog switch AS5 or the analog switch AS6 into a digital signal. The digitized datum is fed to the indicative portion 19 so as to display the color temperature in the display member 23 in FIG. 1.

When the power switches S1 and S2 in FIG. 3 are closed, a high level power-on reset pulse is output from the power-on reset circuit PO constituted by the capacitor C1, the resistor R1 and the inverters IN1 and IN2, and this power-on reset pulse is applied to the reset terminals of the flip-flops FF0, FF1, FF2, DF1, DF2 and DF3 and the counter CO1 via the OR circuit OR1 in FIG. 4, and each of the flip-flops and the counter is reset. Under the condition that the output of the charging completion detecting circuit 8 is at a high level, when the camera shutter is operated to close an X synchro switch S3 in the camera, the output of the inverter IN4 becomes high, by which a pulse for initiating the flash firing is applied to the flip-flops FF0 and FF1 through the AND circuit AN1 from the monostable multivibrator OS4, and the flip-flop FF1 is set so that the $\overline{Q}$ output is inverted to a low level to invert the terminal $a_2$ to a low level. As hereinafter described, analog switches AS7, AS8 and AS9 for discharging the capacitors C4, C5 and C6 (FIG. 3) respectively become non-conductive, and further, the flip-flop FF0 is set so that the analog switches AS1 and AS2 in FIG. 3 become non-conductive.

When the flip-flop FF1 is set, the AND circuit AN2 is enabled to input clock pulses from the pulse generator PG into the counter CO2 through the AND circuit AN2. On the other hand, the above clock pulses are applied to the flip-flop DF1, and Q output of the flip-flop DF1 is applied to the flip-flop DF2 by the next clock pulse. In this manner, after the time lag corresponding to three clocks necessary for stabilizing the signals QB and QR appearing across the resistors R3 and R4 in FIG. 3, the Q output of the flip-flop DF3 is inverted to a high level to output a high-level pulse from the terminal $a_1$ of the monostable multivibrator OS5. This pulse is fed to the flash tube control circuits 2, 4 and 6 in FIG. 3, by which the thyristors SC1, SC2 and SC3 become conductive to enable the firing of the flash tubes XB, XG and XR.

After a lapse of a period sufficient for covering the time from the input of the flash initiation or triggering signal from the X synchro switch S3 to the completion of full firing of the flash tubes XG, XB and XR, a high-level reset pulse is applied from the carry terminal of the counter CO1 to the flip-flops FF0, FF1, DF1, DF2 and DF3 and the counter CO1 through the OR circuit OR1, so that the reset pulse resets each of the flip-flops and the counter to return to the condition before starting of the flashing operation.

Explanation is now made on a method of measuring the amount of light for measuring the color temperature of the ambient light, i.e., the main light source.

When the electronic flash device 20 in FIG. 1 is placed in the vicinity of the object to be photographed with the window 21 being directed toward the main light source and the light measuring button switch 26 is depressed, the switch S4 (FIG. 4) is closed so that the monostable multivibrator OS6 generates a high-level pulse. Since the flip-flop FF2 is reset in this case, the output of the delay circuit DL1 becomes a high level signal which is output from the AND circuit AN3 so that the flip-flop FF2 is set to invert the Q output and $\overline{Q}$ output thereof to high and low levels respectively. In the delay circuits DL1 and DL2, respective outputs become low level and high level after a time longer than the pulse width of the monostable multivibrator OS6. By setting of the flip-flop FF2, the $\overline{Q}$ output thereof is inverted to a low level and the output $a_3$ of the AND circuit AN0 is inverted to a low level so that the analog switches AS1 and AS2 in FIG. 3 become non-conductive. By virtue of this, the information data $\ln(I_G/I_B)$ and $\ln(I_R/I_G)$ are memorized in the capacitors C2 and C3. Since, if the switch S4 is again closed, the flip-flop FF2 is set and the output of the delay circuit DL2 is at a high level, the pulse from the monostable multivibrator OS6 in FIG. 4 is applied to the reset input terminal of the flip-flop FF2 through the AND circuit AN4 and the OR circuit OR2 and the output of the AND circuit AN0 is inverted to a high level so that the analog switches AS1 and AS2 become conductive again. Then the data showing the intensity of the light from the main light source under measurement are output from the operational amplifiers OA4 and OA5. Once the switch S4 is closed to set the flip-flop FF2, the flip-flop FF2 remains set even if the flash firing is completed, so that the analog switches AS1 and AS2 in FIG. 3 remain non-conductive. Therefore, the information data ln(IG/IB) and ln(IR/IG) indicating the amount of the light at the position of the object to be photographed as memorized in the capacitors C2 and C3 are not changed. Consequently, it becomes possible to take photographs repeatedly based on the memorized value, making it unnecessary for the operator to come up to the position of the object to measure the amount of light afresh on each occasion of photo-taking.

Explanation is now made with respect to a case where the picture is taken under the condition that the light measurement button 26 is not operated and the switch S4 is not closed so that the analog switches AS1 and AS2 remain conductive. Since the main light source, dominant in the ambient light usually emits its light from above the object to be photographed, the light receptive window of the electronic flash device 20 is located at the top of the device such that the window 21 is directed upwardly when a picture is taken with the camera supported in a normal position and the flash device mounted on the top of the camera. The blue, green and red zones of the ambient light are respectively received by the photoelectric elements PB1, PB2 and PB3, and the data ln(IB/IG) and ln(IG/IR) representing the ratio of the light components are detected by the subtraction circuits 14 and 15. When, upon opening of the camera shutter, the X synchro switch S3 (FIG. 4) is closed to input the flashing start signal through the terminals JB2 and JS2 to the control circuit 13, the output of the inverter IN4 is inverted to a high level so that the monostable multivibrator OS4 generates a high level pulse. If the output of the charging completion detecting circuit 8 is at a high level in this case, the AND circuit AN1 outputs a high level pulse so that the flip-flop FF0 is set and the output of the AND circuit AN0 is inverted to a low level, thereby making the analog switches AS1 and AS2 non-conductive. Thus, the capacitors C2 and C3 in FIG. 3 memorize information on the light amount from the subtraction circuits 14 and 15 immediately before the firing of the electronic flash device 20, based on which the ratios between the quantities of the lights generated by the flash tubes are controlled. After passage of a period sufficient for the flashing operation, the flip-flop FF0 is reset by a pulse generated from the carry terminal CY of the counter CO1 to again make the analog switches AS1 and AS2 conductive for preparation for the next light measurement operation.

Another embodiment of the present invention is now explained with reference to FIG. 5, in which one of flash tubes XG, XB and XR, e.g., the flash tube XG is first triggered to emit a predetermined amount of light and then the remaining flash tubes XB and XR are triggered to respectively emit flash lights in a ratio defined by the amount of the light reflected from an object to be photographed as illuminated by the flash light from the flash tube XG.

Four D-type flip-flops DF4 through DF7 connected in a cascade connection manner are adapted to feed a control signal to a flash tube control circuit 2 to initiate firing of the flash tube XG. The D input of the first flip-flop DF4 is connected with the output of a flip-flop FF1 and the output of the fourth flip-flop DF7 is connected with a monostable multivibrator OS7, the output of which is connected with the flash tube control circuit 4.

A flip-flop FF3 followed by four D-type flip-flops DF8 through DF11 connected in a cascade connection manner is provided to supply the flash tube control circuits 2 and 6 with control signals. The set input terminal of the flip-flop FF3 is connected with an OR circuit OR5 and the reset input terminal thereof is connected with the output of the OR circuit OR1 as described with reference to FIG. 3. The output of the fourth flip-flop DF11 is connected with a monostable multivibrator OS10, the output terminal of which is connected with the flash tube control circuits 2 and 6.

The flip-flops DF4 to DF11 function to delay the control signal fed from the flip-flop FF1 or the OR circuit OR5 up to a time during when the signals appearing across resistors R3 and R4 are stabilized.

The reset output $\bar{Q}$ of the flip-flop DF7 is connected with an input terminal of a timer T1 through an inverter IN6, and the output of the timer T1 is connected with one input terminal of an AND circuit AN5 through a monostable multivibrator OS9. The output of the AND circuit AN5 is connected with one input terminal of an OR circuit OR5.

A photoelectric element PG3 for receiving the light reflected from an object to be photographed through a green filter FG4 is connected between the input terminals of an operational amplifier OA9 having a capacitor C11 for integrating the photoelectric current flowing through the photoelectric element PG3 when an analog switch AS11 is in an OFF state. The output terminal of the operational amplifier OA9 is connected with one input terminal of a comparator AC4 having another input terminal connected with a DC reference voltage source VE. The output of the comparator AC4 is connected with the input terminal of the OR circuit OR5 through a monostable multivibrator OS6. The output of the OR circuit OR5 is connected with a flashing stop circuit 5. By this circuit arrangement, when the output level of an operational amplifier OA9 exceeds the reference voltage defined by the DC voltage source VE, the comparator AC4 generates a high-level output, which triggers a monostable multivibrator OS8. The output of the monostable multivibrator OS8 is applied to the flash stop circuit 5 to stop firing of the flash tube XG. The output of the OR circuit OR5 is also applied to the set input terminal of the flip-flop FF3 to set the same.

An operational amplifier OA10 having a logarithm compression diode D7 is connected with the output of the operational amplifier OA6 through a resistor R5 to convert the output of the operational amplifier OA6, i.e., the integrated value of the photoelectric current of the photoelectric element PG2 representing the amount of the green light of the flash tube XG into a logarithmically compressed value of the amount of the light. The output of the operational amplifier OA10 is connected with an operational amplifier OA12 through an analog switch AS12 and a polarity inversion circuit OA11 having one input terminal connected with a DC voltage source CE5. The analog switch AS12 is opened by the reset output of the flip-flop DF11. For memorizing the instantaneous output voltage of the operational amplifier OA11, a capacitor C12 is connected with the output terminal of the analog switch AS12 so that the capacitor C12 memorizes the output voltage of the inversion circuit OA11, i.e., the amount of the light detected by the photoelectric element PG2.

The output of the operational amplifier OA12 is also connected with one input terminal of a subtraction circuit 16, another input terminal of which receives a signal coming from either output through the analog switch AS3, i.e., the signal representing the value ln(IG/IB) or the analog switch AS4, i.e., the signal set by the variable resistor VR1.

The output of the subtraction circuit 16 is connected with input terminals of comparators AC5 and AC6, having reference input terminals connected with reference voltage sources CE1 and CE2 respectively. The reference voltage source CE1 has a voltage corresponding to the minimum amount of light that the flash tube XB can be controlled to emit. The reference voltage source CE2 has a voltage corresponding to the maximum amount of the light which the flash tube XB can emit.

The outputs of the comparators AC5 and AC6 are connected with a warning device 29.

The output of the operational amplifier OA12 is also connected with one input terminal of an addition circuit 17, another input terminal of which receives signals coming through either analog switch AS5, i.e., the signal representing the value ln(IR/IG) or the analog switch AS6, i.e., the signal set by a variable resistor VR2. The output terminal of the addition circuit 17 is connected with input terminals of comparators AC7 and AC8 having reference input terminals connected with the reference voltage sources CE3 and CE4. The reference voltage source CE3 has a voltage corresponding to the minimum amount of light that the flash tube XR can be controlled to emit. On the other hand, the reference voltage source CE4 has a voltage corresponding to the maximum amount of the light that the flash tube can be controlled to emit.

The output terminals of the comparators AC7 and AC8 are connected with a warning device 30.

Figure 5:
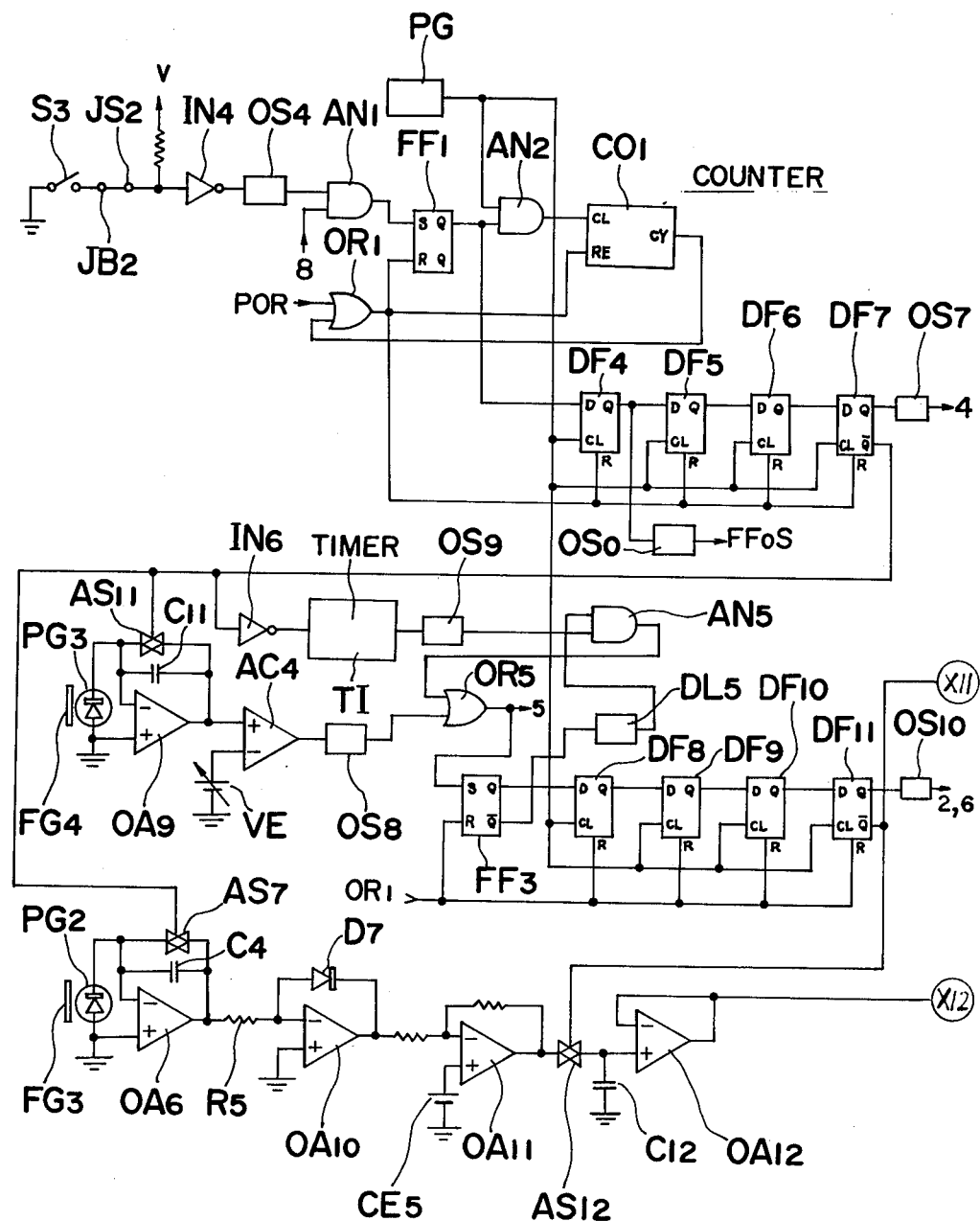
FIG. 5 ( FIGS. 5a and 5b) is a circuit diagram showing another embodiment of the electronic flash device according to the present invention.
Figure 5:
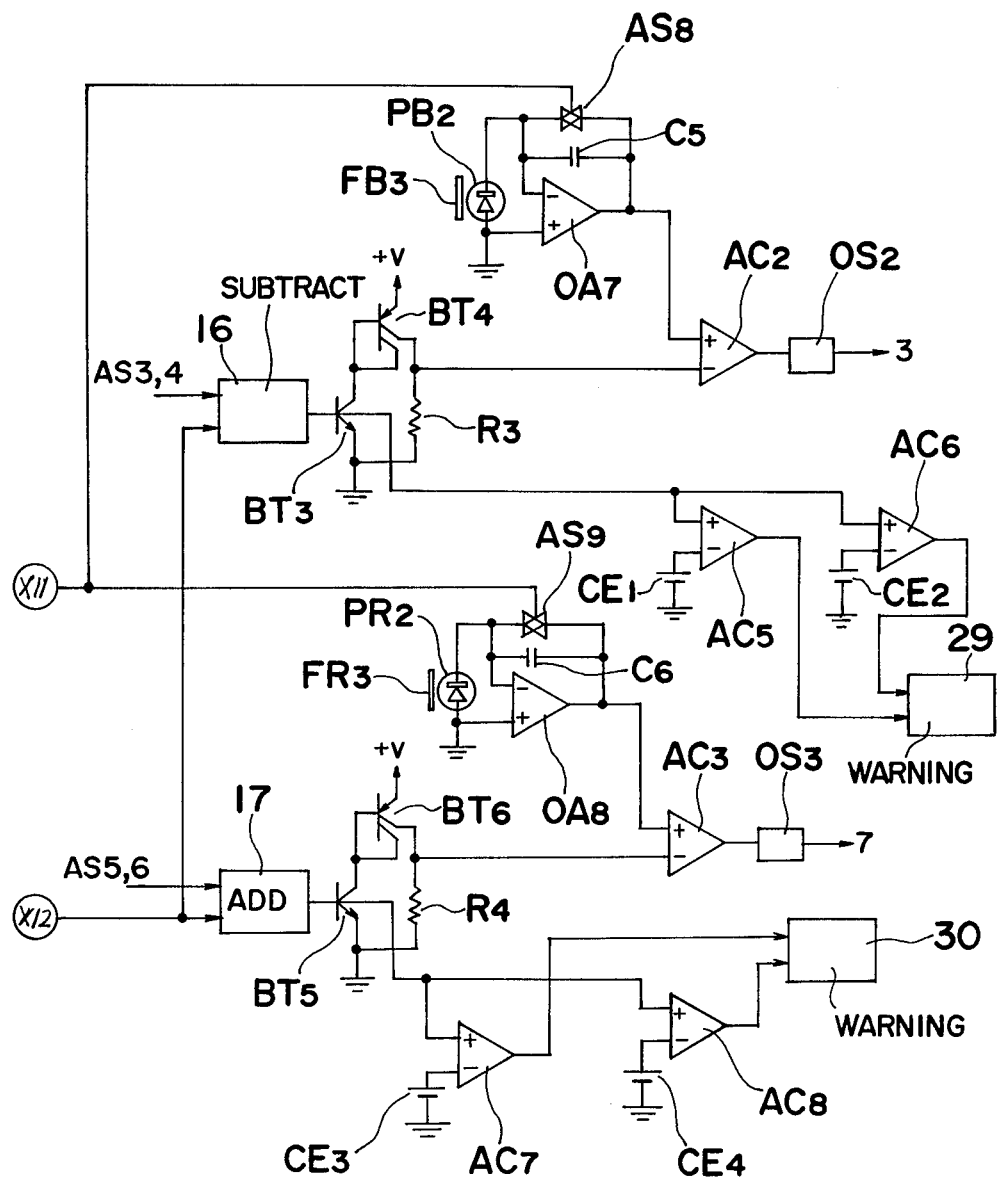

In the circuit arrangement shown in FIG. 5, depending on what mode is selected by the change-over switch S5, the color temperature information ln(IG/IB) given by the measurement of the ambient light or the color temperature information ln(IG/IB) set by the variable resistor VR1 and the emitted amount of light lnQG of the flash tube XG measured by the photoelectric element PG2 are subjected to subtraction in a subtraction circuit 16 to effect calculation of lnQG(IB/IG)=lnQB. The signal lnQB is converted into the signal QB=QG(IB/IG) in the circuit formed by transistors BT3 and BT4 and a resistor R3 and the signal QB is input into the comparator AC2. When the photoelectric element PB2 receives the flash light within the blue range of the flash tube XB and the output of the operational amplifier OA7 coincides with the signal QB, the output of the comparator AC2 becomes a high level, a pulse is output from the monostable multivibrator OS2, and is input into the flash stop circuit 3 of the flash tube XB. In the addition circuit 17, the color temperature information ln(IR/IG) given by the measurement of the ambient light or the color temperature information ln(IR/IG) set by the variable resistor R2 and the amount of the light lnQG of the flash tube XG are added to effect calculation of lnQG (IR/IG)=lnQR, and the signal lnQR is converted by the circuit formed by the transistors BT5 and BT6 and the resistor R4 into a signal QR=QG·(IR/IG), which is input in the comparator AC3. When the photoelectric element PR2 receives flash light within the red range of the flash tube XR and the output of the operational amplifier OA8 coincides with the signal QR, the output of the comparator AC8 becomes high level, and a pulse is output from the monostable multivibrator OS3 and input into the flash stop circuit 7 of the flash tube XR.

To illustrate the operation of the circuit shown in FIG. 5, when the shutter of a camera is opened to close the X synchro switch S3 and a flash trigger signal is output from the monostable multivibrator OS4, the flip-flop FF1 is set to commence the counting operation of the counter CO1. After one clock pulse is generated, the Q output of the flip-flop DF4 becomes high level, and a high level pulse is output from the monostable multivibrator OS0. Then the flip-flop FF0 in FIG. 4 is set, causing analog switches AS1 and AS2 in FIG. 3 to be non-conductive, and the color temperature information data ln(IG/IB) and ln(IR/IG) of the ambient light are memorized in the capacitors C2 and C3 respectively. Further, after three clock pulses are generated, the Q output of the flip-flop DF7 becomes high level, and a high level pulse is output from the monostable multivibrator OS7. This pulse is fed to the flash tube control circuit 4 in FIG. 3 to trigger the flash tube XG which emits light through the filter FG2. When the $\overline{Q}$ output of the flip-flop DF7 becomes low level, analog switches AS11 and AS7 become non-conductive to start charging the output currents of the photoelectric elements PG2 and PG3 in capacitors C4 and C11 respectively.

When the flash tube XG emits the light, the photoelectric element PG3 receives the light reflected from the object to be photographed, and the photoelectric current of the photoelectric element PG3 is charged in the capacitor 11. When the output voltage of the operational amplifier OA9 exceeds the output voltage of the voltage source VE which outputs a signal corresponding to the sensitivity or speed of the film and the diaphragm aperture value of the camera, the output of the comparator AC4 is at a high level, and in turn a high level pulse is output from the monostable multivibrator OS8. The high level pulse is input into the flashing stop circuit 5 in FIG. 3 through the OR circuit OR5 to stop firing of the flash tube XG. Thus, the flash light adequate for a desired amount of exposure can be emitted from the flash tube XG in accordance with the measurement of the light reflected by the object to be photographed.

On the other hand, the output current of the photoelectric element PG2 for detecting the amount of the light emitted from the flash tube XG is charged in the capacitor C4, and the signal QG representing the amount of the light of the flash tube XG is output from the operational amplifier OA6 when the flash tube stops. The output of the operational amplifier OA6 is logarithmically converted by the circuit formed by the resistor R5, the diode D7 and the operational amplifier OA10. That is to say, when the output of the operational amplifier OA6 is assumed to be VG, the diode D7 is supplied with a photoelectric current equal to VG/R5 to make the output of the operational amplifier OA10 −lnVG+lnR5. This output of the operational amplifier OA10 is input into the inversion circuit formed by the reference voltage source CE5, the resistors R6 and R7 and the operational amplifier OA11, and a signal representing CE5−lnR5+lnVG is output from the operational amplifier OA11. In this case, when the output value of the reference voltage source CE5 is set at lnR5, the output of the operational amplifier OA11 becomes lnVG, i.e., lnQG, which is the logarithmically compressed value of the flash light quantity QG emitted from the flash tube XG.

When the flashing stop signal for the flash tube XG is output from the monostable multivibrator OS8, the flip-flop FF3 is set, and then, after four-clock delay time, the Q output of the flip-flop DF11 becomes a high level and the $\bar{Q}$ output becomes a low level. This four-clock delay time is a time necessary for the flash tube XG to completely stop its firing after generation of the flash stop signal. As the $\bar{Q}$ output of the flip-flop DF11 becomes a low level, the analog switch AS12 becomes non-conductive, and the signal lnQG which is the output of the operational amplifier OA11 is memorized in the capacitor C12 and the analog switches AS8 and AS9 become non-conductive to make it possible for the capacitors C5 and C6 to integrate the output currents of the photoelectric elements PB2 and PR2. Also, as the Q output of the flip-flop DF11 becomes a high level, a high level pulse is fed from the monostable multivibrator OS10 to the flash tube control circuits 2 and 6 in FIG. 3 to have the flash tubes XB and XR start flash firing. The flash quantities of these flash tubes XB and XR are detected by the photoelectric elements PB2 and PR2, and the output currents thereof are charged in the capacitors C5 and C6. Then, the voltages QB and QR appearing across the resistors R3 and R4 and the outputs of the operational amplifiers OA7 and OA8 are compared respectively by the comparators AC2 and AC3, and, when the outputs of the comparators AC2 and AC3 are inverted to a high level respectively, the firing of the flash tubes XB and XR is stopped.

In the embodiment as shown in FIG. 5, the flash tube XG is first fired, and when the amount of the reflective light from the object to be photographed and illuminated by the flash tube XG reaches the desired amount, firing of the flash tube XG is stopped, and the flash quantity emitted from the flash tube XG at that time is detected and memorized. Then, based on the information data of the memorized flash quantity and the set or measured color temperature, the light quantities emitted from the flash tubes XB and XR are controlled, thereby controlling the ratio of the quantities of the light emitted from the flash tubes XB, XG and XR. In other words, control of the flash light quantity to obtain a proper exposure amount is made by a reflective light system, and control of the ratio of the light emitted from the flash tubes is made by an incident light system.

In FIG. 5, when $\bar{Q}$ output of the flip-flop DF7 becomes low level, the output of the inverter IN6 becomes a high level, and the timer TI starts to count time. This time is set to be longer than the time required for full firing of the flash tube XG. When the output of the comparator AC4 is not inverted to a high level even after the full firing of the flash tube XG, the flip-flop FF3 remains reset at that time, so that the output of the timer TI is inverted to a high level, and the high level pulse output from the monostable multivibrator OS9 is output through the AND circuit AN5 and the OR gate OR5, by which the flip-flop FF3 is set to start flashing of the flash tubes XB and XR.

The reference voltage sources CE1 and CE2 respectively output the information data on the minimum flash amount and the maximum flash amount controllable by the flash tube XB, and the reference voltage sources CE3 and CE4 respectively output the information data of the minimum flash amount and the maximum flash amount controllable by the flash tube XR. Accordingly, when the output of the subtraction circuit 16 lnQB is smaller than CE1, the output of the comparator AC5 becomes low level, and when lnQB is larger than CE2, the output of the comparator AC6 becomes high level, by which the warning circuit 29 operates to warn that it is impossible to control the flash quantity ratio of the flash tubes XG and XB to the set or measured color temperature. Likewise, when lnQB is smaller than CE3, the output of the comparator AC7 becomes low level, and when lnQR is larger than CE4, the output of the comparator AC8 becomes high level, by which the warning circuit 30 operates to also warn that it is impossible to control the flash quantity ratio of the flash tubes XG and XR to the set or measured color temperature.

A modification of a color temperature setting device is explained hereinafter.

Figure 6:
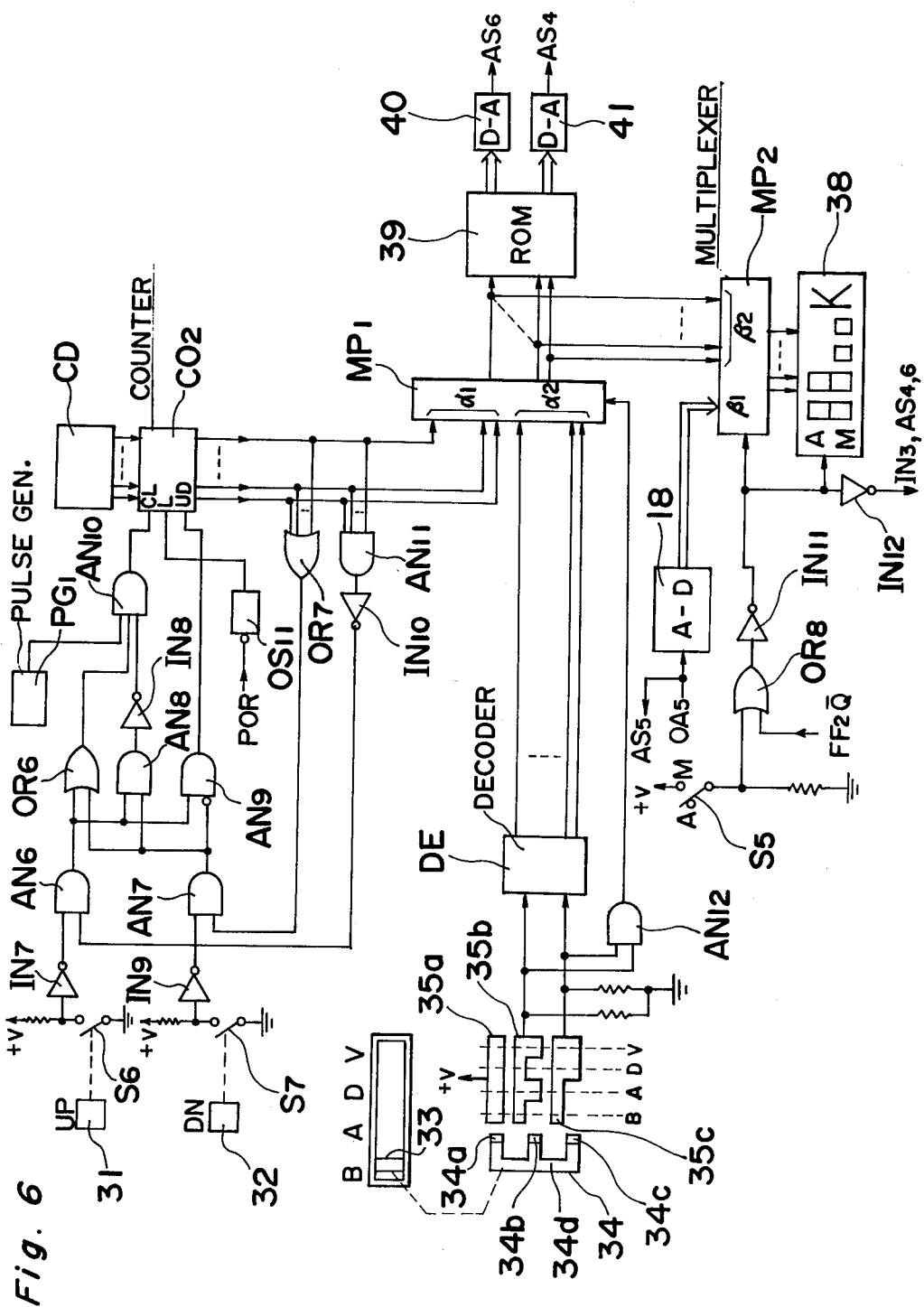
FIG. 6 is a circuit diagram showing another example of a circuit arrangement of the color temperature information producing device.

Referring to FIG. 6, a manually operated color temperature setting member 33 is linked with a slider 34 having three movable contacts 34a, 34b and 34c connected with each other by a conductor 34d.

The setting member 33 and the slider 34 can be manually set in any one of the positions indicated by symbols B, A, D and V, each of which represents a type of a film.

A fixed contact 35a supplied with a DC voltage +V is provided for being brought into contact with the movable contact 34a and toothed fixed contacts 35b and 35c are provided for being brought into contact with the movable contacts 34b and 34c so that a coded signal corresponding to the set position of the movable member 33 can be generated from the fixed contacts 35b and 35c.

The fixed contacts 35b and 35c are connected with a decoder DE, the output terminal of which is connected with input terminals α2 of a multiplexer MP1 which is controlled by an output signal of an AND circuit AN12, the input terminals of which are connected with the fixed contacts 35b and 35c.

Other input terminals α1 of the multiplexer MP1 are connected with the output terminals of a counter CO2 which acts to count pulses fed from a pulse generator PG1 through an AND circuit AN10.

A switch S6 operated by an UP button 31 for incrementing the value of the color temperature datum is connected with one input terminal of an AND circuit AN6 through an inverter IN7 while a switch S7 operated by a DOWN button 32 for decrementing the value of the color temperature datum is connected with one input terminal of an AND circuit AN7 through an inverter IN9. Both of the outputs of the AND circuits AN6 and AN7 are connected with input terminals of an AND circuit AN8, an OR circuit OR6 and an INHIBIT circuit AN9. The output terminal of the OR circuit OR6 is connected with the second input terminal of an AND circuit AN10 and the output terminal of an AND circuit AN8 is connected with the third input terminal of the AND circuit AN10 through an inverter IN8. By this circuit arrangement, when the switch S6 is in an ON state while the switch S7 is in an OFF state, the AND circuit AN10 is enabled to allow passing of pulses from the pulse generator PG1 to the clock input terminal of a counter CO2 and a high level signal is applied to the input terminal UP of the counter CO2 through the INHIBIT circuit AN9 for operating the counter CO2 as an UP counter. On the other hand, when the switch S7 is in an ON state while the switch S6 is in an OFF state, the AND circuit AN10 is enabled, and the output of the INHIBIT circuit AN9 is at a low level to operate the counter CO2 as a DOWN counter. When both of the switches S6 and S7 are simultaneously in an ON state, the output of the inverter IN8 is at a low level to disable the AND circuit AN10.

A setting device CD for setting a constant color temperature is connected with the input terminals of the counter CO2 so that the counter CO2 starts counting of data from the value set by the setting device CD.

Input terminals of an OR circuit OR7 are connected with all of the output terminals of the counter CO2 while the output of the OR circuit OR7 is connected with an input terminal of an AND circuit AN7 for preventing decrement of contents of the counter CO2 less than zero.

Input terminals of an AND circuit AN11 are connected with all of the output terminals of the counter CO2 with the output terminals thereof and connected with an input terminal of the AND circuit AN8 through an inverter IN10 for preventing the count of the counter CO2 from exceeding the maximum value of the counter CO2 by stopping the counting operation.

The output of the multiplexer MP1 is connected with input terminals of a ROM (read only memory) 39, the output terminals of which are connected with digital-to-analog converters 40 and 41. The outputs of the digital-to-analog converters 40 and 41 are fed to analog switches AS6 and AS4 (FIG. 3).

The output terminals of the first multiplexer MP1 are connected with input terminals of a second multiplexer MP2, the output terminals of which are connected to a display device 38 for displaying the color temperature with either a character A showing an automatic mode or a character M showing a manual mode.

The multiplexer MP2 is operated by a signal fed from an OR circuit OR8 through an inverter IN11 to output a datum $\beta 1$ fed from an analog-to-digital converter 18 or a datum $\beta 2$ fed from the ROM 39.

The input terminals of the OR circuit OR8 are connected with a switch S5 and the $\overline{Q}$ output terminal of the flip-flop FF2.

When the setting member 33 is set at a "B" position, movable contacts 34a, 34b and 34c are at the "B" positions on the fixed contacts 35a, 35b and 35c and data "00" are output from the fixed contacts 35b and 35c. These data are converted into the data corresponding to the color temperature of 3,200° K. by means of the decoder DE. Under this condition, since the two inputs to the AND circuit AN12 are both at a low level, its output is at a low level. Then the output of the decoder DE is output from the multiplexer MP1 and the address of ROM 39 is designated. Then, from the ROM 39 the data corresponding to ln(IG/IB) and ln(IR/IG) memorized in an address $\alpha 2$ are output. These data are converted into analog signals by digital-to-analog converters 40 and 41 and input into analog switches AS4 and AS6 in FIG. 3. The data of 3,200° K. from the multiplexer MP1 are fed through the multiplexer MP2 to a display device 38, thus the color temperature 3,200° K. is displayed with the character "M" if the switch S5 is set to the "manual" mode.

Similarly, when the setting member 33 is set either at the positions "A" or "D", based on the data of "10" or "01" from the fixed contacts 35b or 35c, a signal of ln(IG/IB) or ln(IR/IG) for 3,400° K. or 5,500° K. is output either from the digital-to-analog converters 40 or 41, and "3,400° K." or "5,500° K." is displayed in the display device 38.

When the setting member 33 is at "V" position, the set color temperature becomes variable. The outputs of the fixed contacts 35b and 35c at this time are "11", and the output of the AND circuit AN12 becomes a high level. By this, the data fed to the input terminal $\alpha 1$ are output from the multiplexer MP1.

Explanation is given on the circuit arrangement for providing the data $\alpha 1$ for the multiplexer MP1. When power is supplied, a power-on reset signal drops and a high-level pulse is output from the monostable multivibrator OS11, by which the data from the setting device CD are latched on the counter CO2. These data correspond to, e.g., 5,500° K. And, when the UP button 31 provided on the electronic flash device (not shown) is pressed to close the switch S6, the output of the inverter IN7 becomes a high level, the output of the AND circuit AN6 becomes a high level, and further, the output of an AND circuit AN9 also becomes a high level. This enables an AND circuit AN10, by which the clock pulse from the pulse generator PG1 is applied to the counter CO2, and the counter CO2 adds the clock pulses. The data of this counter CO2 are applied to the display device 38 through the multiplexers MP1 and MP2, and the data are displayed in the display device 38. When the switch S6 is opened by detouchment from the UP button 31, the AND circuit AN10 is disabled to stop increment of the counter CO2. Accordingly, the desired color temperature data are kept in the counter CO2.

When the UP button is continuously depressed to make all the outputs of the counter CO2 at a high level, the output of the AND circuit AN11 becomes a high level and the output of the inverter IN10 becomes a low level, by which the output of the AND circuit AN6 becomes a low level to disable the AND circuit AN10, so that the clock pulse from the pulse generator PG1 is prevented from being input into the counter C02, and the output of the counter C02 is fixed to the maximum value.

When the DOWN button 32 provided on the electronic flash device 20 is depressed to turn the switch S7 on, the outputs of the inverter IN9 and the AND circuit AN7 become a high level. The AND circuit AN10 is enabled, and the clock pulses from the pulse generator PG1 are input into the counter C02. In this case, as the output of the AND circuit AN9 becomes a low level and the terminal UD of the counter C02 also becomes a low level, the counter C02 decreases its contents. When the switch S7 is OFF, the output of the AND circuit AN7 becomes a low level, the AND circuit AN10 is disabled to stop decrease of the counter C02, with the contents retained. When, as a result of the subtraction, all the outputs of the counter C02 become a low level, the output of the OR circuit OR7 becomes a low level, the output of the AND circuit AN7 becomes a low level and the AND circuit AN10 is disabled to prevent clock pulses from being input into the counter C02. Accordingly, the output of the counter C02 is fixed to the lowest value.

When the UP button 31 and the DOWN button 32 are simultaneously depressed, the output of the AND circuit AN8 becomes a high level and the output of the inverter IN8 becomes a low level to close the AND circuit AN10, thus causing no variation to the output of the counter C02.

In the case where, in order to effect automatic light measurement, a change-over switch 25 is switched to AUTO, the switch S5 is set to the terminal A, and the light measuring switch S4 in FIG. 4 is at once closed to set the flip-flop FF2, then the output of the OR circuit OR8 becomes a low level and the output of the inverter IN11 becomes a high level, so that, from the multiplexer MP2, there are input the data of data input 1, i.e., the data obtained from the operational amplifier OA5 in FIG. 5 with the analog-to-digital converter 18. On the display device 38, there is displayed a character "A" indicative of automatic light measurement mode and the measured color temperature. In such the case where, even if the switch S5 is set to the terminal A, the flip-flop FF2 in FIG. 4 remains in a reset condition and the analog switches AS1 and AS2 remain conductive, the output of the inverter IN11 in FIG. 6 is at a low level. Accordingly, from the multiplexer MP2 data 2, which is the output of the multiplexer MP1, is output, by which, in the display device 38, a character "M" and the color temperature set by the counter C02 are displayed, and the signal from the inverter IN11 is fed to the inverter IN3 in FIG. 3 and the analog switches AS4 and AS6, so that the analog switches AS4 and AS6 are energized and the set data from the digital-to-analog converters 40 and 41 are output. That is to say, when, even if the mode is selected to automatic light measurement, no measurement of color temperature at the position of the object to be photographed is effected, the ratio of the amount of light emitted from the flash tubes XB and XG is controlled based on the color temperature set by the counter C02.

Figure 7:
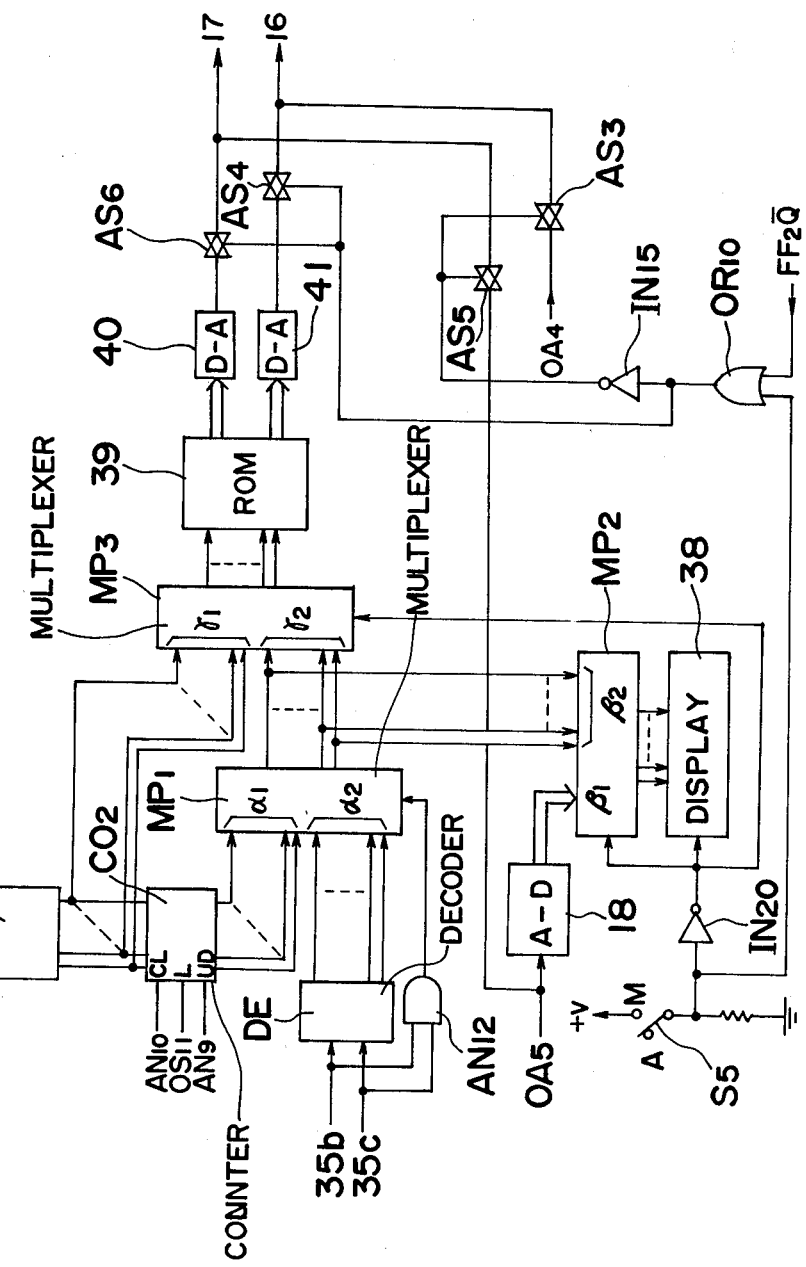
FIG. 7 is a circuit diagram showing a modification of the color temperature information producing device.

Another modification of the color temperature setting device is shown in FIG. 7 in which a multiplexer MP3 is provided between the multiplexer MP1, the setting device and the ROM 39. The input terminals $\gamma 1$ of the multiplexer MP3 are connected with the output terminals of the setting device CD with the input terminals connected with the output terminals of the multiplexer MP1. The output terminals of the multiplexer MP3 are connected with the input terminals of the ROM 39. The control input terminal of the multiplexer MP3 is connected with an inverter IN20, the input of which is connected with the switch S5.

The analog switches AS5 and AS6 are controlled by the output of an OR circuit OR10, the input terminals of which are connected with the switch S5 and the $\overline{Q}$ output of the flip-flop FF2 (FIG. 4) and the analog switches AS3 and AS5 are controlled by the output of an inverter IN15, the input terminal of which is connected with the output of the OR circuit OR10.

In the circuit arrangement shown in FIG. 7, when the switch S5 is switched to the manual mode, a low level signal is applied to the control input terminal of the multiplexer MP3, which produces the constant color temperature, 5500° K. for example, applied to the input terminals $\gamma 1$ from the setting device CD, whereby the ROM 38 produces the data ln(IG/IB) and ln(IR/IG) corresponding to the constant color temperature 5500° K. Then the digital-to-analog converters 40 and 41 output analog signals corresponding to the constant color temperature. The analog signals are fed to the subtraction circuit 16 and the addition circuit 17 through the analog switches AS4 and AS6 which are opened by the outputs of the OR circuit OR10.

When the switch S5 is switched to the automatic mode, a high level signal is applied to the control input terminal of the multiplexer MP3, which produces the color temperature fed to the input terminals $\gamma 2$ of the multiplexer MP3 from the multiplexer MP1. Thus in a case where the flip-flop FF2 is reset, the values ln(IG/IB) and ln(IR/IG) corresponding to the color temperature fed from the decoder DE are applied to the digital-to-analog converters 40 and 41 from the ROM 39.

When the switch S5 is switched to the automatic mode with the flip-flop FF2 being set, the output of the OR circuit OR10 becomes low, causing the analog switches AS4 and AS6 to be closed. On the other hand, the analog switches AS3 and AS5 are opened by the high output of an inverter IN15, whereby the data ln(IG/IB) and ln(IR/IG) corresponding to the color temperature measured by the photoelectric elements PG1, PB1 and PR1 are fed to the subtraction circuit 16 and the addition circuit 17.

According to the modification shown in FIG. 7, when the light measurement is not performed at the position of the object under the automatic mode, the light ratio control of the flash tubes can be performed on the basis of the constant temperature of 5500° K. which is used with the highest frequency.

FIG. 8 shows specific characteristics of a filter in which a transmission factor increases continuously corresponding to a variation of colors from blue to red. Such filters have been manufactured and sold by HOYA Glass Corporation.

The following embodiments of the electronic flash device utilize such a filter as described above, in which the rays of light of a flash tube passing through the filter of the above type and the rays of light emitted directly from the flash tube (or light having equal light values of green, blue and red) are mixed so as to change the color temperature.

Explanation of the principle of the above flash light control is hereinafter made with reference to FIG. 8.

Assuming that y is an amount of red light passing through a filter having transmission characteristics as shown in FIG. 8, x is an amount of blue light, QR: the sum of amount of the red light passing through a filter having the characteristics shown in FIG. 8 and amount of the red component of direct light, QB: the sum of amount of blue light passing through a filter and the amount of the blue component of direct light, XR: amount of the red component of the direct light, and, XB: amount of blue light. Further assuming XR=XB=x for brevity, the following relations are established:

$$x+y=QR$$

$$x+z=QB$$

$$y/z=k>1$$

wherein k is the ratio of amount of blue light and red light passing through the filter.

Furthermore, the following can be obtained:

$$QR/QB=l>1$$

Then following equations obtained from the above four relations, $$x = \frac{k-l}{(k-1)} QB \quad (1)$$

$$y = \frac{k(l-1)}{(k-1)} QR \quad (2)$$

$$y = \frac{k(-1)}{k-l} x \quad (3)$$

can be obtained.

Referring to FIG. 9, a flash tube control circuit 51 controls firing of a xenon flash tube 52 by triggering a thyristor 53. A flash stop the circuit 54 acts to stop firing of the flash tube 52.

A flash tube control circuit 55 controls firing of a xenon flash tube 56 by triggering a thyristor 57. A firing stop the circuit 59 acts to stop firing of the flash tube 56. A filter 58 having transmission characteristics shown in FIG. 8 is disposed in front of the flash tube 56 so that light of the flash tube 56 can be emitted through the filter 58.

A photoelectric element PR5 associated with a red filter FR5 is connected with an operational amplifier OA20 having a logarithmic compression diode D20, the output of which is connected with one input of a subtraction circuit 67.

A photoelectric element PB5 for receiving blue light through a blue filter FB5 is connected with an operational amplifier OA21 having a logarithm compression diode D21, the output of which is connected with another input terminal of the subtraction circuit 67. From the output of the subtraction circuit 67, the data ln(IR/IB) of the object illuminating or ambient light can be produced.

The output of the subtraction circuit 67 is connected with an operational amplifier OA22 through an analog switch AS20 which is controlled by a signal fed from the terminal $a_2$ of the control circuit 13 (FIG. 3). A capacitor C20 for memorization of an instantaneous value of the output of the operational amplifier 67 is connected with the input terminal of the operational amplifier OA22. The output of the operational amplifier OA22 is connected with the input terminal of an analog-to-digital converter 60 through an analog switch S21 which is opened when the switch S5 is switched to the automatic mode. A slide contact of a variable resistor VR5 fed with the DC current from the constant current source CI5 is connected with the input terminal of the analog-to-digital converter 60 through an analog switch AS22 which is opened when the switch S5 is switched to the manual mode. ROMs 61 and 62 are accessed by the data fed from the analog-to-digital converter to produce data of following relations:

$$\ln\left\{\frac{l-k}{l(k-1)}\right\}, \ln\left\{\frac{k(l-1)}{l(k-1)}\right\}$$

The data of the ROMs 61 and 62 are respectively fed to digital-to-analog converters 63 and 64, the outputs of which are fed to input terminals of addition and logarithmic expansion circuits 65 and 66 to calculate the following equations:

$$\ln QR + \ln\left\{\frac{k-l}{l(k-1)}\right\} = \ln\left\{QR \cdot \frac{k-l}{l(k-1)}\right\} \quad (4)$$

$$\ln QR + \ln\left\{\frac{k(l-1)}{l(k-1)}\right\} = \ln\left\{QR \cdot \frac{k(l-1)}{l(k-1)}\right\} \quad (5)$$

The outputs of the addition and logarithm expansion circuits 65 and 66 are respectively applied to inverting input terminals of comparators AC20 and AC21.

A photoelectric element PR6 for receiving the light of the flash tube 52 through a red filter FR6 is connected with input terminals of an operational amplifier OA24 having a charging capacitor C21 for integrating the current of the photoelectric element PR6 when an analog switch AS23 is opened. The output of the operational amplifier OA24 is connected with the non-inverting input of a comparator AC20, the output terminal of which is connected with the flash stop circuit through a monostable multivibrator OS20.

A photoelectric element PR7 for receiving the light of the flash tube 56 through the red zone filter FR7 is connected with an operational amplifier OA25 having a charging capacitor C22 for integrating the current of the photoelectric element PR7 when an analog switch AS24 is opened.

The output of the operational amplifier OA25 is connected with the non-inverting input of a comparator AC21, the output terminal of which is connected with a flash stop circuit 59 through a monostable multivibrator OS21.

Operation of the circuit arrangement of FIG. 9 is hereinafter explained. Assuming that the switch S5 is switched to an automatic mode to open the analog switch AS21, the photoelectric elements PR5 and PB5 receive the object illuminating or ambient light through the filters FB5 and FR5, the output currents IR and IB of which are logarithmically compressed by the diodes D20 and D21 and in turn lnIR and lnIB are produced from the operational amplifiers OA20 and OA21. The outputs of the operational amplifiers OA20 and OA21 are subjected to subtraction in the subtraction circuit to produce ln(IR/IB)=lnl, which data are applied to the operational amplifier OA22 and the capacitor C20 through the analog switch AS20. When the flash start switch S3 is operated to start flash firing, the analog switch AS20 is brought into a non-conductive condition so that the data lnl of the subtraction circuit 67 is kept in the capacitor C20. The data lnl memorized in the capacitor C20 are applied to the analog-to-digital converter 60 through the operational amplifier OA22 and the analog switch AS21, so that the data lnl are digitized.

ROMs 61 and 62 are accessed by the digital data to produce the following data:

$$\ln\left\{\frac{k-l}{l(k-1)}\right\}, \ln\left\{\frac{k(l-1)}{l(k-1)}\right\}$$

The output data of ROMs 61 and 62 are converted into analog data in the digital-to-analog converters 63 and 64. Addition and logarithmic expansion circuits 63 and 64 operate the equations (3) and (4) and logarithmically expand the same.

On the other hand, by closure of the switch S3, the control circuit 13 produces a signal $a_1$, by which the flash tubes 52 and 56 are fired. The flash lights are received by the photoelectric elements PR6 and PR7, the currents of which are charged in the capacitors C21 and C22. When the output of the operational amplifier OA24 corresponding to the amount of light emitted by the flash tube 52 exceeds the output data x, the comparator AC20 produces a high level signal by which the monostable multivibrator OS20 is triggered to produce a flashing stop signal to stop the firing of the flash tube 52.

In a similar manner, when the amount of the light emitted from the flash tube 56 exceeds the output data y, the comparator AC21 produces a high level signal by which the flash tube 56 stops firing.

Figure 10:
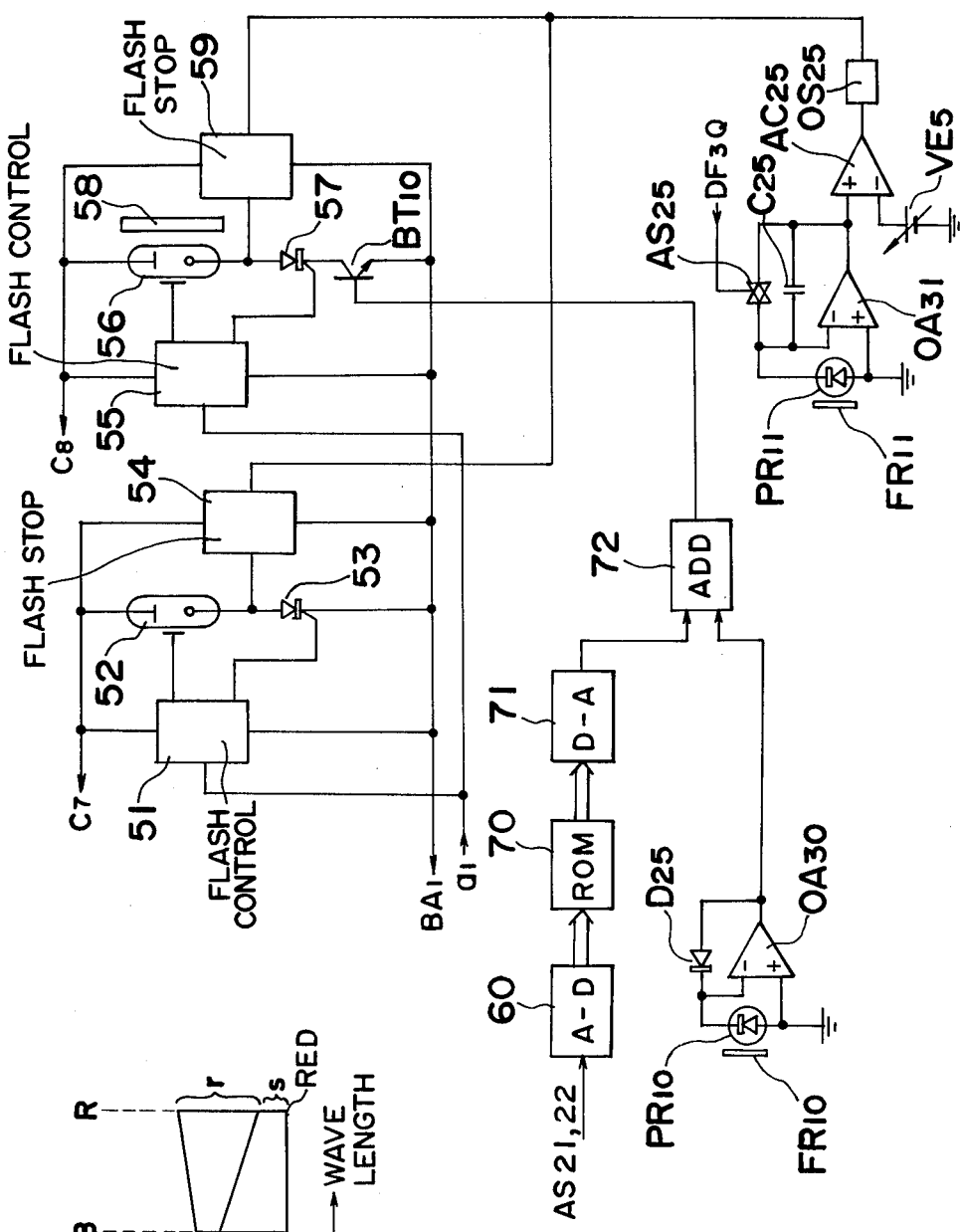
FIG. 10 is a circuit diagram showing one modification of the embodiment employing another type of filter.

FIG. 10 is a modification of the embodiment shown in FIG. 9, in which a ROM 70 outputs:

$$\ln\left(\frac{k(l-1)}{k-l}\right) \qquad 5$$

the output data of the analog-to-digital converter 60.

The output data of the ROM 70 is applied to one input terminal of an addition circuit 72 through a digital-to-analog converter 71.

A photoelectric element PR10 for receiving the flash light of the flash tube 52 through a red filter FR10 is connected with input terminals of an operational circuit OA30 having a logarithmic compression diode D25. The output of the operational amplifier OA25 is connected with the input terminal of the addition circuit 72.

A photoelectric element PR11 for receiving, through a red filter FR11, the light reflected from the object to be photographed is connected with input terminals of an operational amplifier OA31 having a capacitor C25 for integrating the current of the photoelectric element PR11 when an analog switch AS25 is opened. The output terminal of the operational amplifier OA31 is connected with a noninverting input terminal of a comparator AC25, the inverting input terminal thereof is connected with a reference voltage source VE. The output of the comparator AC25 is connected with a monostable multivibrator OS25.

The ROM produces:

$$\ln\left(\frac{k(l-1)}{k-l}\right)$$

in response to the data ln(IR/IB) fed from the analog-to-digital converter 60. The data of the ROM 70 is converted into analog signals and in turn applied to the addition circuit 72. The addition circuit 72 calculates:

$$\ln HR + \ln\left(\frac{k(l-1)}{k-l}\right) = \ln\left(HR \cdot \frac{k(l-1)}{k-l}\right) \qquad (6)$$

wherein HR is a logarithm compression from the current of the photoelectric element PR10.

The output data of the addition circuit 72 is applied to the base of a transistor BT10 to control intensity of the light of the flash tube 56 by controlling the current thereof.

Operation of the circuit arrangement shown in FIG. 10 is hereinafter explained.

The analog-to-digital converter 60 receives the data ln(IR/IB)=(lnl) from either the operational amplifier OA22 or the variable resistor VR5, shown in FIG. 9, and the data are converted into the digital form. The ROM 70 is accessed by the data from the analog-to-digital converter 60 to produce the following data:

$$\ln\left(\frac{k(l-1)}{k-l}\right)$$

The data of the ROM 71 are converted into analog forms, which are applied to the addition circuit 72.

On the other hand, the photoelectric element PR10 produces the current HR monitoring the flash light of the flash tube 52, and in turn the current is logarithmically compressed by the operational amplifier OA30 and the diode D25 to output lnHR. The addition circuit 72 outputs:

$$\ln HR + \ln\left(\frac{k(l-1)}{k-l}\right) = \ln\left(HR \cdot \frac{k(l-1)}{k-l}\right) \qquad (6)$$

The output of the addition circuit 72 is applied to the base of the transistor BT10, which logarithmically expands the value shown in the relation (6) whereby the current of the flash tube 56 is controlled by the value:

$$HR \cdot \frac{k(l-1)}{k-l}$$

This means that the flash tubes 52 and 53 emit lights conforming to the relation (3).

The photoelectric element PR11 receives a combination of the rays of the flash lights of the flash tubes 52 and 56, and the current of the photoelectric element is integrated in the capacitor C25. The output of the operational amplifier OA31 is applied to the comparator AC25 and is compared with the reference voltage source VE5. When the total amount of light of the flash tubes 52 and 56 exceeds the reference value defined by the voltage source VE6, the output of the comparator AC25 is inverted to a high level, so that the monostable multivibrator OS25 produces a high level pulse to stop the flash tubes 52 and 56.

The filter 58 for the flash tube 56 may be replaced by such a filter that the transmission factor in the red zone is smaller than that in the blue zone. Such a filter is manufactured and sold by HOYA Glass Corporation in the name of an LB System Filter.

Furthermore, a combination of a non-filtered light and the light passing through the red filter may be used to change the color temperature.

Furthermore, in order to change the color temperature, a combination of the non-filtered light and the light passing through the red filter and the light passing through blue and green zone filters can be used. Other various lights having various spectral characteristics can be combined for controlling the color temperatures.

Figure 11:
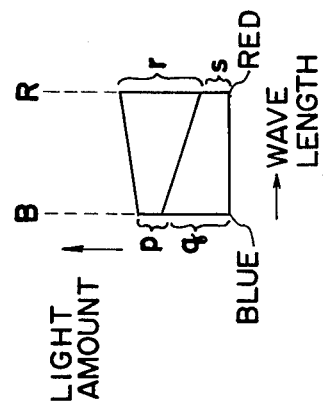
FIG. 11 is a graph showing color transmission characteristics of a filter employed in the embodiment shown in FIG. 10.

FIG. 11 shows an essential principle of combining lights passing through two kinds of filters for controlling the color temperature.

In a similar manner as described in FIG. 8, the following relations are established between the red zone light and the blue zone light:

p+q=QB r+s=QR

QR/QB=l>1 q/s=k1>1 r/p=k2>1

From the above relations:

$$s = \frac{k2 - l}{l \cdot (k1 \cdot k2 - 1)} \cdot QR$$

$$r = \frac{k2 \cdot (l \cdot k1 - 1)}{l(k1 \cdot k2 - 1)} \cdot QR$$

-continued
$$r = \frac{k2 \cdot (l \cdot k1 - 1)}{k2 - l} \cdot s$$

Therefore, in the embodiment shown in FIG. 9, the ROMs 61 and 62 are programmed to change the data lnl into:

$$\ln\left(\frac{k2 - l}{l \cdot (k1k2 - 1)}\right)$$

$$\ln\left(\frac{k2 \cdot (k1 - 1)}{l \cdot (k1k2 - 1)}\right)$$

In the embodiment shown in FIG. 10, the ROM 70 is programmed to change the data lnl into:

$$\ln\left(\frac{k2(lk1 - 1)}{k2 - l}\right)$$

In the embodiments described above, the light measuring parts such as the photoelectric elements and the operational amplifiers can be arranged in a separate compartment independently of the flash device in such a manner that the compartment can be mounted on the flash device with the respective connecting terminals connected by signal wires. In the above case, the capacitors C2 and C3 may be arranged in such a manner that the capacitors C2 and C3 are disconnected from the input terminals of the operational amplifiers OA4 and OA5 when the light measuring parts are separated from the flash device, and the capacitors C2 and C3 are automatically connected with the input terminals of the operational amplifiers OA4 and OA5 when the light measuring parts are mounted on the flash device for a flashing operation.

What is claimed is:

1. An electronic flash device for use in a still camera, said device comprising:
   means for producing color temperature information;
   at least two flash light emitting means, each of which can emit flash light having different spectral characteristics;
   calculation circuit means for calculating a ratio of the amounts of light to be emitted by the respective flash light emitting means on the basis of the information fed from the means for producing the color temperature information; and
   control circuit means for controlling the emission of light of the respective flash light emitting means in such a manner that the ratio of the light amount emitted from the respective flash light emitting means corresponds to the ratio calculated by the calculation circuit means.

2. The electronic flash device according to claim 1, wherein said device further comprises data producing means for producing light amount data representing an amount of light to be emitted from one of said flash light emitting means for a desired exposure, said calculation circuit means determines the light amount to be emitted from one of the flash light emitting means on the basis of the data fed from the data producing means and the control circuit means operates to control the flash light to the light amount determined by the operational circuit means.

3. The electronic flash device according to claim 1, wherein said means for producing color temperature information comprises a plurality of light measuring circuits each having a light receiving element and means for measuring the light incident on said light receiving element, said light receiving elements having different spectral sensitivity and a color temperature calculating circuit for calculating the color temperature data of the incident light on the basis of the results of the measurement by the light measurement circuits.

4. The electronic flash device according to claim 1, wherein said means for producing color temperature information comprises manually operated setting means for setting a desired color temperature.

5. The electronic flash device according to claim 1, wherein said means for producing color temperature information is adapted to produce the color temperature assigned to light sensitive elements to be used.

6. The electronic flash device according to claim 1, wherein said means for emitting flash light comprises three flash tubes associated with different color filters respectively.

7. The electronic flash device according to claim 6, wherein said flash tubes are xenon tubes.

8. The electronic flash device according to claim 1, wherein said means for producing color temperature information includes a manual means for setting a datum of a color temperature and means for generating a signal corresponding to the set datum.

9. The electronic flash device according to claim 8, wherein said manual means is settable to one of the positions correpsonding to the spectral sensitivity characteristic of a light sensitive material for the picture taking.

10. The electronic flash device according to claim 8, wherein said manual means is settable to positions corresponding to different types of films with respect to the color temperature suitable for each film.

11. An electronic flash device for use with a still camera, said device comprising:
    means for producing color temperature information;
    at least two flash light emitting means each of which can emit light having different spectral characteristics;
    first flash control means provided for controlling the starting and stopping of the light emission of one of the flash light emitting means;
    second light measuring means for measuring the amount of light emitted from said one of the flash light emitting means;
    light amount calculating means for calculating the amount of light to be emitted by the remaining flash light emitting means on the basis of a value defined by the amount of light measured by the second light measuring means and the color temperature information; and
    second flash control means for controlling the starting and stopping of the remaining flash light emitting means on the basis of the result of the calculation in the light amount calculation means.

12. The electronic flash device according to claim 11, wherein said first flash control means comprises light measuring means for measuring the light reflected from an object illuminated by the flash light of the first flash light emitting means; and
    means for producing a control signal to stop the flash light of said one of the flash light emitting means when the light amount measured by the light measuring means attains a predetermined value.

13. The electronic flash device according to claim 11, wherein said means for producing color temperature information comprises a plurality of light measuring circuits each having a light receiving element and means for measuring the light incident on said light receiving elements, said light receiving elements having different spectral sensitivity and a color temperature calculating circuit for calculating the color temperature data of the incident light on the basis of the results of the measurement by the light measurement circuits.

14. The electronic flash device according to claim 11, wherein said means for producing color temperature information comprises manually operated setting means for setting a desired color temperature.

15. The electronic flash device according to claim 11, wherein said means for producing color temperature information includes a manual means for setting a datum of a color temperature and means for generating a signal corresponding to the set datum.

16. The electronic flash device according to claim 11, wherein said means for emitting flash light comprises two flash tubes with different color filters attached respectively.

17. The electronic flash device according to claim 16, wherein said flash tubes are xenon tubes.

18. An electronic illuminating device for cameras comprising:
means for measuring the amount of red, blue and green color in an ambient light object scene and producing corresponding color signals;
means for producing color temperature signals from the color signals to calculate the desired quantity of each light to be added to the ambient light to produce a uniform color tone of the desired scene to be recorded including means for taking into consideration the spectral characteristics of the recording medium;
means for selectively emitting light of a red, blue and green color; and
means for controlling the total quantity of one color light produced by the emitting means as a function of the total quantity of another color predetermined from the means for producing color temperature signals and a ratio of the actually measured light of those respective colors.

19. The invention of claim 18 wherein the means for emitting light is a flash device that sequentially emits light of different colors.

20. The invention of claim 19 further including a light mixing box for receiving each colored light.

21. The invention of claim 19 wherein the means for controlling produces a signal to stop the emitting means from emitting a particular color when the predetermined quantity of that color for producing a uniform color tone has been reached.

22. The invention of claim 18 further including a timing means wherein the remaining colors are emitted after a predetermined time period if the quantity of a preceding color being emitted does not reach its predetermined value.

23. The invention of claim 22 further including a warning device to indicate the failure of the means for emitting light to provide a sufficient quantity of a particular color.

24. An auxiliary illumination lighting device to assist in recording color images of an object scene comprising:
means for measuring the amount of ambient light of different spectral values and producing corresponding signals;
means for providing color temperature information from the measured signals to enable a uniform color tone of the desired scene to be recorded;
at least two separate sources of light for emitting light of different spectral characteristics, and
automatic means for controlling the total quantity of light of one spectral characteristic as a function of a total quantity of the other spectral characteristic light predetermined from the means for providing color temperature and a ratio of the actually measured light of each spectral characteristic.

* * * * *